(12) United States Patent
Prabhakar et al.

(10) Patent No.: US 11,960,587 B2
(45) Date of Patent: Apr. 16, 2024

(54) METHODS, SYSTEMS AND COMPUTER PROGRAM PRODUCTS FOR MONITORING OR CONTROLLING USER ACCESS AT A POINT-OF-SERVICE

(71) Applicant: OPTIML VISION INC., Newark, CA (US)

(72) Inventors: Salil Prabhakar, Fremont, CA (US); Alexander Ivanisov, Newark, CA (US)

(73) Assignee: OPTIML VISION INC., Newark, CA (US)

( * ) Notice: Subject to any disclaimer, the term of this patent is extended or adjusted under 35 U.S.C. 154(b) by 0 days.

(21) Appl. No.: 18/134,245

(22) Filed: Apr. 13, 2023

(65) Prior Publication Data
US 2023/0252121 A1    Aug. 10, 2023

(51) Int. Cl.
G06F 21/00 (2013.01)
G06F 21/32 (2013.01)
G06Q 20/40 (2012.01)

(52) U.S. Cl.
CPC ....... *G06F 21/32* (2013.01); *G06Q 20/40145* (2013.01)

(58) Field of Classification Search
CPC .......................... G06F 21/32; G06Q 20/40145
See application file for complete search history.

(56) References Cited

U.S. PATENT DOCUMENTS

| | | | |
|---|---|---|---|
| 11,232,450 B2 | 1/2022 | Starr et al. | |
| 11,487,860 B2 * | 11/2022 | McKell-Redwood | H04L 9/3231 |
| 2005/0147292 A1 | 7/2005 | Huang et al. | |
| 2009/0164797 A1 | 6/2009 | Kramer | |
| 2010/0030696 A1 * | 2/2010 | Naccache | G06Q 20/40 382/117 |
| 2014/0015930 A1 | 1/2014 | Sengupta | |
| 2017/0357981 A1 * | 12/2017 | Azzam | G06Q 20/40145 |
| 2019/0130171 A1 | 5/2019 | Alameh et al. | |
| 2020/0177584 A1 * | 6/2020 | Wajs | G06F 21/32 |
| 2020/0204548 A1 | 6/2020 | Song et al. | |
| 2020/0329035 A1 | 10/2020 | Gorgenyi et al. | |
| 2021/0117524 A1 * | 4/2021 | McKell-Redwood | H04L 9/3231 |
| 2021/0304210 A1 * | 9/2021 | Goda | G06Q 20/02 |
| 2022/0108323 A1 | 4/2022 | Starr et al. | |
| 2022/0188954 A1 * | 6/2022 | Callaghan | H04L 9/3231 |

FOREIGN PATENT DOCUMENTS

| | | |
|---|---|---|
| CN | 104680131 B | 1/2019 |
| KR | 101100700 B1 | 12/2011 |
| TW | 1734385 B1 | 7/2021 |
| WO | 2017091431 A1 | 6/2017 |
| WO | 2019140157 A1 | 7/2019 |

\* cited by examiner

*Primary Examiner* — Jeffrey C Pwu
*Assistant Examiner* — William A Corum, Jr.
(74) *Attorney, Agent, or Firm* — Budzyn IP Law, LLC

(57) ABSTRACT

The invention relates to the domain of biometric based identity authentication of an individual. In particular, the invention provides methods, systems and computer program products for convenient and secure biometric authentication of a user of a service, at a point-of-service. The invention relies on network interactions between a user communication device, a point-of-service terminal and a service-access-control system.

30 Claims, 10 Drawing Sheets

METHODS, SYSTEMS AND COMPUTER PROGRAM PRODUCTS FOR MONITORING OR CONTROLLING USER ACCESS AT A POINT-OF-SERVICE

FIELD OF THE INVENTION

The invention relates to the domain of biometric based identity authentication of an individual. In particular, the invention provides methods, systems and computer program products for monitoring or controlling a user's access to a service, at a point-of-service.

BACKGROUND

With the increased popularity of electronic services, and services that are electronically managed or activated, or that involve electronic access control, individuals are routinely required to authenticate themselves as a prerequisite to being provided access to such services, or as a prerequisite to enable monitoring or control of a user's access to such services. Without loss of generality, service examples may include any physical access, logical access, electronic access, payment, billing, charging, or any type of monitoring, personalization, or privilege that is specific to the user. Without loss of generalization, a service may include airline bag drop, airline check-in, airport security clearance, immigration control, airplane boarding, airport lounge access, in-flight payment such as for food and drinks, payment for airline ticket or extras such as extra baggage or seat selection, use of airline voucher for any purpose, hotel check-in, hotel payment, payments for food or drinks billed to hotel room, parking, paying for parking, recalling a parked car, swimming pool access, lounge access, renting a car, paying for a car rental, access to a parking lot, exiting a parking lot, availing restaurant loyalty discounts, any electronic payment by credit card or debit card or bank account information, any payment by any customer account information, paying for toll, ordering food or other items at any location, picking up food or drinks or anything else at any location including inside the store or at drive-through, accessing a computer, accessing an account, logging into a computer, picking up child from school or day-care, purchasing any restricted item, proving in-person presence, access to a sporting event or concert or show, access to a conference or exhibition, access to government building, road side or entrance or premise security check, visitor security check, showing identifying information to any personnel or reading device or computing device, availing any government benefit such as medical treatment or discounted/free food or discounted/ free clothes, driving privilege, privilege to pass through, privilege to be present, or any other privilege, personalization, monitoring or access.

Electronic identity authentication processes, as well as processes for controlling or monitoring a user's access to a service, typically implement some form of a challenge—response based authentication. For example, a business providing an online service may identify a user by a unique username, and may authenticate the user using a password or a PIN. In some implementations, an online service may issue a digital key/token to the user, the user stores it on her personal device, and releases it to the online service for account access. The user may in turn protect access to the digital key/token on her device by locking her/his device and unlocking it with a password, a PIN, or a biometric.

Some systems implement additional steps for higher security. For example, an online service may send a code to the user's registered email address or phone number and the user provides it back to the online service in addition to or in-place of the password. In another scenario, the user provides some knowledge that is presumably known only to that user, such as place of birth, color of first car, etc.

In the physical world, at a point of service, use of a username/password to identify and authenticate a user is so inconvenient that it is impractical. It is typical for the business to issue/accept its own or a delegate's/associate's physical key, token, or card. There are different methods of presenting the card to the business' point of service terminal such as magnetic stripe, contact and contactless (RFID or NFC) secure chip, etc. In some implementations, the identity and authentication details are stored on the user's smartphone and released to the terminal via a QR code, NFC emulation, Bluetooth, Ultrawide Band, or Wi-Fi. For instance, in Tesla's™ "phone-as-a-key" system, a user's smartphone is paired with a specific terminal/asset (a Tesla car in this case) using Bluetooth and the smartphone's proximity to the car is used for authentication.

Other solutions for identity authentication or for monitoring or controlling a user's access to a service in the physical world involve biometric authentication wherein the biometric type may be any one of a voice, iris, retina, fingerprint, palm-print, palm vein, periocular, facial characteristic, ear, DNA (deoxyribonucleic acid), scleral vein, finger geometry, palm geometry, gait, heartbeat, vascular, signature, or any other human body part based biometric. Biometric technologies enable fast and accurate identification of individuals by comparing a biometric sample that is acquired at the point-of-service (or point of authentication) against one or more verified biometric templates associated with persons who are authorized to access a specific service, and allowing access to the service in case the acquired biometric sample matches one of the verified biometric templates. In certain biometric implementations, verified biometric templates of persons authorized to access the specific service may be obtained from a trusted intermediary platform that serves as a repository of pre-verified biometric templates. An example of this approach is the "Amazon One" product from Amazon, where a user enrolls her/his biometric(s) with a central service and the point-of-service compares a live sample of her/his biometric(s) with all users enrolled with "Amazon One". While this solution offers user convenience, the central database of biometric information is prone to hacking. Additionally in such solutions, the system becomes increasingly slow and unusable as the size of the enrollee database size increases—particularly since biometric errors are directly proportional to the database size. This approach is believed to be impractical if the number of enrolled users would be in the millions.

In other solutions, a user may store a digital token (for example, a PIN, password or pre-signed or pre-certified verified biometric template) on a personal device (such as a smartphone) and may transmit this digital token from the personal device to the point-of-service for identity authentication. In specific implementations, a user may have to take a smartphone out of her/his pocket or purse, unlock it, start an application, select menu options, and then present a QR code from the smartphone screen or transmit a token or a biometric template via a near-field-communication (NFC) communication session by bringing her smartphone to the terminal within a short distance (typically within 10 cm). For instance, in PayPal's in-store payment system, the user presents a QR code from her/his smartphone's PayPal application to the merchant's terminal for identity authentication and transaction confirmation. This solution has been found to be insecure since physical things, including personal devices such as smartphones, can be shared, lost, or stolen. As a compromise, the user's smartphone and/or PayPal app may be required to be unlocked with a PIN, password, or biometric before being allowed to present the digital token. In another example, as described in mobile driver license standard ISO/IEC 18013-5, the user presents her pre-certified verified biometric template to the point-of-service terminal from her personal smartphone using either NFC or QR code, and the terminal performs a 1:1 biometric comparison between the template and a live biometric capture to confirm the user's identity to the service such as airport access. However, substantial user inconvenience remains a problem as these solutions are not handsfree and require several steps to be taken by the user in order to get identified.

There is accordingly a need for solutions that enable service providers to securely and accurately identify and authenticate a user at a point-of-service, and/or to monitor or control a user's access to a service at a point-of-service, irrespective of the number of users enrolled for identity authentication (i.e. irrespective of the database size), without centralized storage of large biometric database that may be prone to hacking, without the point-of-service terminal being able to decipher the user's identity or location, and without the service getting access to user's biometric data. Additionally, there is a need for such solutions to enable user identity authentication with minimal effort (and preferably no effort) on the part of the user, while ensuring that a service provider can uniquely identify and authenticate an authorized user seamlessly at the point-of-service, while simultaneously ensuring data privacy and data security.

SUMMARY

The invention present invention provides methods, systems and computer program products for monitoring or controlling a user's access to a service, at a point-of-service.

In an embodiment, the invention comprises a method for monitoring or controlling a user's access to a service at a point-of-service. The method comprises performing at a processor implemented point-of-service terminal, the steps of (i) receiving a first data payload from a first communication device, wherein (a) data within the first data payload is based on a first data block stored in a memory that is accessible by the first communication device, wherein the first data block corresponds to a second data block stored in a memory that is accessible by a service-access-control system, and (b) at least one of the data within the first data payload or the first data block or the second data block is associated with any of the user, the service, or user's access to the service; (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) and transmitting a second data payload to the service-access-control system. Data within the second data payload is based on the data within the first data payload. Additionally, the data within the second data payload enables the service-access-control system to identify the user based on output from a computation involving the data within the second data payload and data within the second data block. In an embodiment of this method, the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In another embodiment, the invention provides a method for monitoring or controlling a user's access to a service at a point-of-service terminal, comprising performing at a processor implemented first communication device, the steps of (i) transmitting to the point-of-service terminal, a first data payload, wherein (a) data within the first data payload is based on a first data block stored in a memory accessible by the first communication device, (b) the first data block corresponds to a second data block stored in a memory that is accessible by a service-access-control system, and (c) at least one of the data within the first data payload or the first data block or the second data block is associated with any of the user, the service or user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal authorizing or recording the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In yet another embodiment the invention provides a method for monitoring or controlling a user's access to a service at a point-of-service terminal, comprising performing at a processor implemented service-access-control system, the steps of (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

The invention also provides a point-of-service terminal configured for monitoring or controlling a user's access to a service at a point of service. The point-of-service terminal comprises at least one processor and at least one memory, and is configured to implement the steps of (i) receiving a first data payload from a first communication device—wherein (a) data within the first data payload is based on a first data block stored in a memory that is accessible by the first communication device, wherein the first data block corresponds to a second data block stored in a memory that is accessible by a service-access-control system, and (b) at least one of the data within the first data payload or the first data block or the second data block is associated with the any of the user, the service, or user's access to the service, (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) transmitting a second data payload to the service-access-control system—wherein (e) data within the second data payload is based on the data within the first data payload, (f) the data within the second data payload enables the service-access-control system to identify the user based on output from a computation involving the data within the second data payload and data within the second data block, and (g) the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In another embodiment, the invention provides a first communication device configured for monitoring or controlling a user's access to a service at a point-of-service. The first communication device comprises at least one processor, and at least one memory, and is configured to implement the steps of (i) transmitting to the point-of-service terminal, a first data payload, wherein (a) data within the first data payload is based on a first data block stored within a memory that is accessible by the communication device, (b) the first data block corresponds to a second data block stored in a memory that is accessible by a service-access-control system, and (c) at least one of the data within the first data payload or the first data block or the second data block is associated with any of the user, the service or with user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

The invention additionally provides a service-access-control system configured to enable secure biometric authentication at a point-of-service terminal in connection with a request for providing a service to a user. The service-access-control system comprises at least one server, said at least one server comprising at least one processor and at least one memory, wherein the service-access-control system is configured to implement the steps of: (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, based on the result of the computation, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In a specific embodiment of the service-access-control system, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In one embodiment, the invention provides a computer program product for monitoring or controlling a user's access to a service at a point-of-service, comprising a non-transitory computer readable medium having a computer readable program code embodied therein, the computer readable program code comprising instructions for performing at a processor implemented point-of-service terminal, the steps of (i) receiving a first data payload from a first communication device, wherein (a) data within the first data payload is based on a first data block stored in a memory that is accessible by the first communication device, wherein the first data block corresponds to a second data block stored in a memory that is accessible by a service-access-control system, and (b) at least one of the data within the first data payload or the first data block or the second data block is associated with any of the user, the service, or user's access to the service; (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) and transmitting a second data payload to the service-access-control system. Data within the second data payload is based on the data within the first data payload. Additionally, the data within the second data payload enables the service-access-control system to identify the user based on output from a computation involving the data within the second data payload and data within the second data block. In an embodiment of this method, the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In another embodiment, the invention provides a computer program product for monitoring or controlling a user's access to a service at a point-of-service terminal, comprising a non-transitory computer readable medium having a computer readable program code embodied therein, the computer readable program code comprising instructions for performing at a processor implemented first communication device, the steps of (i) transmitting to the point-of-service terminal, a first data payload, wherein (a) data within the first data payload is based on a first data block stored in a memory accessible by a first communication device, (b) the first data block corresponds to a second data block stored in a memory that is accessible by a service-access-control system, and (c) at least one of the data within the first data payload or the first data block or the second data block is associated with any of the user, the service or user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal authorizing or recording the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In yet another embodiment, the invention provides a computer program product for monitoring or controlling a user's access to a service at a point-of-service terminal, comprising a non-transitory computer readable medium having a computer readable program code embodied therein, the computer readable program code comprising instructions for performing at a processor implemented service-access-control system the steps of (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

The computer program products according to the present invention may be configured to perform any one or more of the specific method embodiments of the invention that are described in the following written description.

BRIEF DESCRIPTION OF THE ACCOMPANYING DRAWINGS

DETAILED DESCRIPTION

The invention relates to the domain of biometric based identity authentication of an individual. In particular, the invention provides methods, systems and computer program products for monitoring or controlling a user's access to a service, at a point-of-service.

Figure 1:
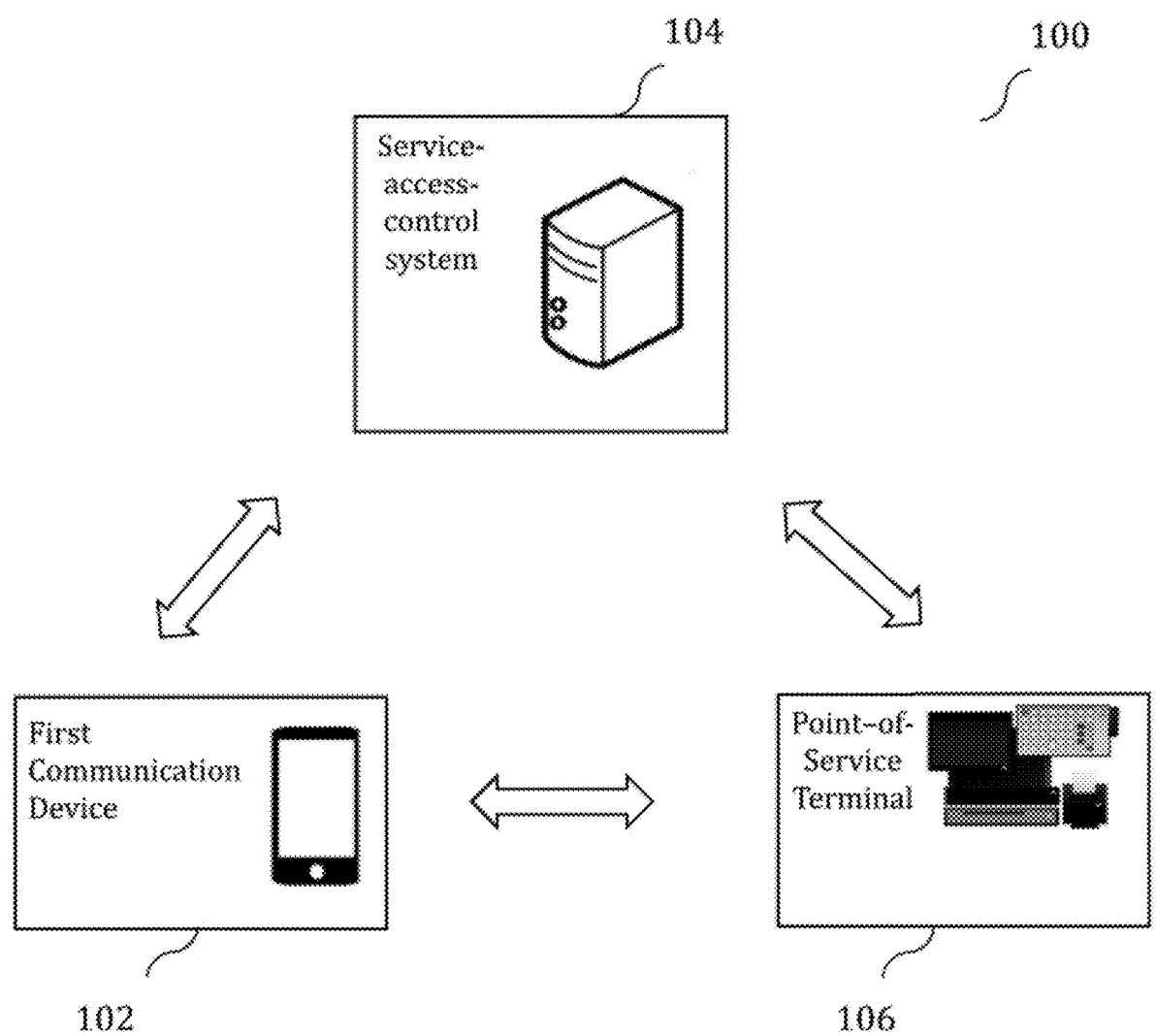
FIG. 1 illustrates a first embodiment of a system environment within which the present invention may be implemented.

The present invention is implemented within a system environment 100 of the kind illustrated in FIG. 1. System environment 100 comprises a first communication device 102, a service-access-control system 104, and a point-of-service terminal 106.

First communication device 102 may comprise any processor based electronic communication device or communication terminal that is configured to implement data processing functionality, network communication functionality and/or wireless communication functionality. In various non-limiting embodiments, first communication device 102 may comprise any of a portable computer, tablet computer, phablet, cellular phone, smartphone, personal digital assistant, a wearable device such as a smartwatch, smart glasses, smart lenses, smart clothing or the like, or any other portable communication device configured to implement data processing functionality, network communication functionality and/or wireless communication functionality. In an embodiment, first communication device 102 may be configured according to the device configuration illustrated in FIG. 6. The configuration and functionality of first communication device 102 for the purposes of implementing the present invention is described in more detail hereinbelow.

Service-access-control system 104 may comprise any processor based electronic data processing system that is configured to implement data processing functionality, and/or network communication functionality. In an embodiment, service-access-control system 104 comprises at least one processor implemented server or data processing device. In another embodiment, service-access-control system 104 comprises a plurality of processor implemented servers or a plurality of data processing devices operating in a network configuration or in a distributed computing configuration for implementing the functionality of service-access-control system 104. In an embodiment, service-access-control system 104 may be configured according to the device configuration illustrated in FIG. 7. The configuration and functionality of service-access-control system 104 for the purposes of implementing the present invention is described in more detail hereinbelow.

Point-of-service terminal 106 may comprise any processor based electronic device or terminal that is configured to implement data processing functionality, biometric sample acquisition functionality, biometric comparison functionality, network communication functionality and/or wireless communication functionality. In an embodiment, point-of-service terminal 106 may implement such functionality directly or through one or more peripheral devices or auxiliary devices that are communicably coupled with point-of-service terminal 106. In various non-limiting embodiments, point-of-service terminal 106 may comprise any of a portable computer, tablet computer, phablet, cellular phone, smartphone, personal digital assistant, a point-of-sale terminal, a point-of-sale kiosk, a cash register, an electronic door lock, a checkpoint device, or a gate control device that controls or selectively permits access of authorized individuals into a restricted access area (e.g. into a venue for a sporting event, a flight, a vehicle rental, a lodging rental, a concert, a performance, a movie, public transport, and so on), or the like. In an embodiment, point-of-service terminal 106 may be configured according to the device configuration illustrated in FIG. 8. The configuration and functionality of point-of-service terminal 106 for the purposes of implementing the present invention is described in more detail hereinbelow.

Figure 2:
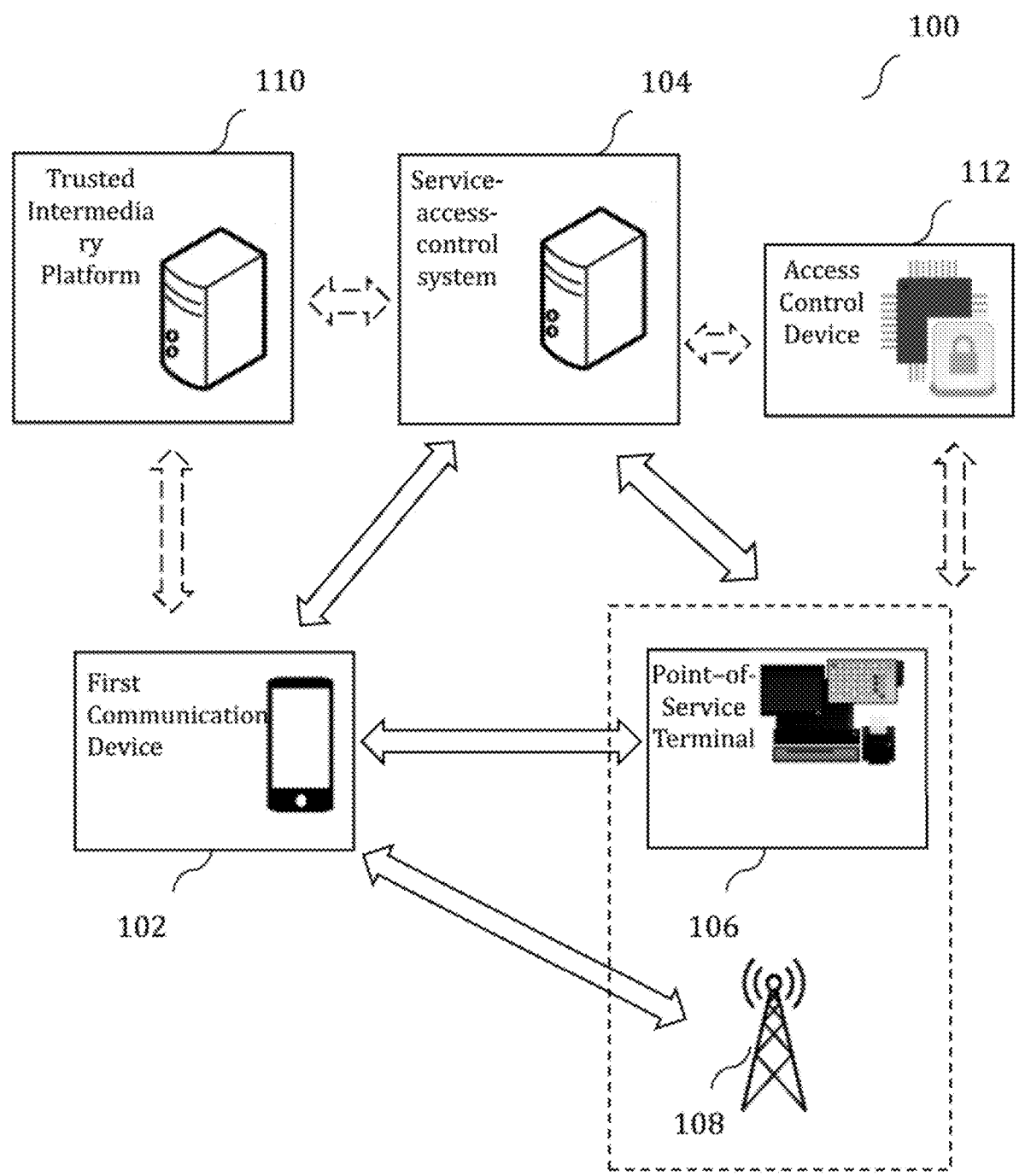
FIG. 2 illustrates a second embodiment of a system environment within which the present invention may be implemented.

FIG. 2 illustrates an alternative embodiment of system environment 100, which in addition to first communication device 102, service-access-control system 104, and point-of-service terminal 106 includes (i) an access point device 108 that is configured to broadcast a limited range or short range wireless signal or beacon which can be received by first communication device 102, (ii) a trusted intermediary platform 110 that is configured for network communication with one or both of first communication device 102 and service-access-control system 104, and (iii) an access control device 112, which is configured to restrict or control access to a product or service or location.

For the purposes of implementing the solutions of the present invention, service-access-control system 104 is configured to implement, on behalf of one or more businesses, services or service providers, solutions for enabling monitoring or controlling a user's access to a service from such business(es), service(es) or service provider(s), and/or solutions to ensure that a service is accessible only by authorized users of such services. For this purpose, service-access-control system 104 is configured to (i) communicate with first communication device(s) 102 that is associated with or operated by one or more authorized users of such services, for the purpose of receiving user requests for accessing such services, and (ii) communicate with one or more point-of-service terminals 106 that are located where the services are intended to be provided to authorized users—for the purposes of determining whether a requestor of a service, who is present at such point-of-service terminal(s) 106 is in fact an authorized user. Each point-of-service terminal 106 may in turn be configured to communicate with (i) first communication device(s) 102 and (ii) with service-access-control system 104.

In certain embodiments (for example, the embodiment illustrated in FIG. 2), access to the service may be controlled by access control device 112. Access control device 112 may be integrated within point-of-service terminal 106, or alternatively may be distinct from point-of-service terminal 106. In embodiments where access to a service is controlled by access control device 112, service-access-control system 104 may be configured for network communication with access control device 112, and for transmitting control signals to access control device 112 for the purpose of selectively enabling or disabling access to a service through access control device 112. In one embodiment, the function of access control device may be fulfilled manually be a person such as a security guard or an immigration officer, who may physically prevent access to the user.

In other embodiments where access control device 112 is integrated within point-of-service terminal 106, or where point-of-service terminal 106 is configured to perform the functionality of an access control device 112, service-access-control system 104 may be configured to transmit control signals to point-of-service terminal 106 for the purpose of selectively enabling or disabling access to a service through point-of-service terminal 106. In yet other embodiments, service-access-control system 104 is integrated within point-of-service terminal 106, or alternatively point-of-service terminal 106 is configured to perform the functionality of service-access-control system 104, and in such embodiments service-access-control system 104 may be configured to transmit control signals internally within point-of-service terminal 106 for the purpose of selectively enabling or disabling access to a service through point-of-service terminal 106. In such embodiments where point-of-service terminal 106 software and service-access-control system 104 software are executed on the same processor, they are isolated from each other, for example they run in separate processes and/or separate containers, so that biometric data in not accessible to the service-access-control system 104. In one example, the service-access-control system may simply display the user's passport details on a screen for a human security or immigration officer to review and compare against the user's name on a flight boarding card and physically grant or prevent access through a security checkpoint.

For the purposes of the invention, an authorized user has an existing user account or user identity that has been generated and/or is stored with the concerned business, service or service provider, or with its delegate or affiliate. The user may have registered for the user account with a username and password and/or the user may have provided strong identity credentials such as a driver license, residential address, social security number, etc. The business may have used identity assurance techniques to verify the identity credentials. In an embodiment, information corresponding to the authorized user, user account or user identity is stored in a database associated with the concerned business, service or service provider—which database may be accessible by service-access-control system 104. In another embodiment, the user may provide account information or service information at the time of availing the service. For instance, a user may provide a boarding card with name and flight detail at the time of access.

Each authorized user configures (or provisions) a first communication device 102 that is owned, controlled or operated by, or that is associated with, the authorized user—for enabling secure biometric authentication of the user at one or more point-of-service terminal(s) 106. In an embodiment, configuring or provisioning a first communication device 102 comprises downloading onto the first communication device 102, an application software associated with the concerned business, service, service provider, or service access-control-system 104.

In a further embodiment, the application software may require a user to provide consent for accessing the business or service at one or more point-of-service terminal(s) 106. Configuring and/or provisioning first communication device 102 may additionally involve the user enrolling one or more biometrics corresponding to such user, on the first communication device 102. The enrolled biometric is stored as an encrypted or unencrypted biometric template within a memory of first communication device 102. The enrolled biometric may be obtained from the user through a live biometric capture process performed using one or more sensors integrated within or coupled with first communication device 102. In another embodiment, the enrolled biometric may be read from a file or received through an application programming interface (API) or from a biometric database maintained by a third party or extracted from a photo encoded as a QR code or extracted from a picture of a photo ID document (such as a driver's license or a passport) or read from an NFC chip of an ID document such as a biometric passport. In particular embodiments, biometric data may be enrolled as a valid biometric template for the purposes of performing the present invention, only after authenticating or validating the biometric data—for example, after validating an acquired biometric against a government issued photo ID, or a $3^{rd}$ party ID, or after validation of the biometric by the business or service provider.

Provisioning the first communication device 102 additionally includes storing a first data block in a memory that is accessible by first communication device 102, and a second data block in a memory that is accessible by service-access-control system 104—wherein the first data block corresponds to the second data block. At least one of the first data block or the second data block is associated with the user, or with a request from the user or from the first communication device 102, for accessing or receiving one or more services.

The correspondence between the first data block and the second data block may be defined by a set of one or more predefined functions. In various embodiments (i) the first data block is generated based on data within a data payload received at the first communication device 102 from the service-access-control system 104 or from a trusted intermediary, or (ii) the second data block is generated based on data within a data payload received at the service-access-control system 104 from the first communication device 102 or from a trusted intermediary, or (iii) each of the first data block and the second data block include a set of data included within the other of the first data block and the second data block, or (iv) the first data block and the second data block are identical, or (v) one of the first data block and the second data block is derived from the other of the first data block and the second data block, or (vi) each of the first data block and the second data block are generated based on at least one of a common shared secret data block or a common key derivation function. In various embodiments, one or both of the first data block and the second data block may comprise or be derived from any data record associated with the user, such as user's biometric data or data derived from the user's biometric data, a digital token or digital key assigned to user, or some cryptographic construct derived from user specific data such as the user's email address, phone number, customer number, reservation number, flight number, seat number, order number, driver license details, passport details, date of birth, social security number, bank account details, credit/debit card details, etc. In an embodiment, one or both of the first data block and the second data block may comprise a cryptographic hash of the user biometric template or the user biometric data. In one embodiment, either the data in the first data block or the data in the second data block, or data in both the data blocks may be entered manually into the system by keying the data using a keyboard or other input methods.

In an embodiment, both of the first data block and the second data block are generated at first communication device 102, the first data block is stored in a memory of (or in a memory that is accessible by) first communication device 102, and the second data block is transmitted from first communication device 102 to service-access-control system 104, whereinafter said second data block is stored in a memory that is accessible by service-access-control system 104.

In another embodiment, both of the first data block and the second data block are generated at service-access-control system 104, the second data block is stored in a memory that is accessible by service-access-control system 104, and the first data block is transmitted from service-access-control system 104 to first communication device 102, whereinafter the first data block is stored in a memory of (or in a memory that is accessible by) first communication device 102.

In another embodiment, the first data block is generated at first communication device 102 and is stored in a memory of (or in a memory that is accessible by) first communication device 102, and the second data block is generated at service-access-control system 104 and is stored in a memory that is accessible by service-access-control system 104—wherein each of the first and second data blocks are generated using a shared secret or shared secret algorithm.

In another embodiment, at least one of the first data block and the second data block are generated at a processor implemented trusted intermediary platform 110. In an embodiment where the first data block is generated at a processor implemented trusted intermediary platform 110, said first data block is transmitted to first communication device 102 and is stored in a memory of (or in a memory that is accessible by) first communication device 102. In an embodiment where the second data block is generated at a processor implemented trusted intermediary platform 110, said second data block is transmitted to service-access-control system 104 and is stored in a memory accessible by service-access-control system 104.

In certain embodiments, one or both of the first data block and the second data block may be generated and stored at first communication device 102 and service-access-control system 104 respectively, in response to a request initiated by first communication device 102 for access to a specific service or specific instance of a service. In other embodiments, one or both of the first data block and the second data block may be associated with a user of first communication device 102, or with a user request for a specific user access, or for access to a specific service or specific instance of a service.

In an embodiment, the first data block is generated based on data within a data payload received at the first communication device 102 from service-access-control system 104 or from a trusted intermediary. In an embodiment, the second data block is generated based on data within a data payload received at the service-access-control system 104 from the first communication device 102 or from a trusted intermediary.

First communication device 102 may be configured to receive wireless signals based on one or more wireless communication protocols or standards—for example, any of cellular communication protocols (e.g. GSM, CDMA, EDGE, 3G, LTE, 4G or 5G), Wi-fi, Bluetooth, Bluetooth Low Energy, NFC (near-field-communication), IOT (Internet-of-things), Ultra-wide band, or RFID (radio frequency ID) communication protocols.

In an embodiment, first communication device 102 may be configured to respond to detection of a trigger event, by initiating transmission of a first data payload to point-of-service terminal 106, wherein the first data payload includes data based on the first data block stored within a memory of (or in a memory that is accessible by) first communication device 102. For the purposes of the present invention the "first data payload" may comprise any part of data or data packet(s) transmitted from first communication device 102 to point-of-service terminal 106, other than data that is included only to enable delivery of the transmitted data or data packet(s).

In an embodiment, the trigger event that is detected by first communication device 102 (i.e. which detected trigger event triggers initiation of transmission of a first data payload to point-of-service terminal 106) may comprise receiving at first communication device 102, a predefined wireless signal (for example a beacon signal) that is transmitted from point-of-service terminal 106 or from an access point device 108. In other embodiments, the trigger event that is detected by first communication device 102 may comprise any of (i) a triggered time based alarm or alert, (ii) a triggered location based alarm or alert, or (iii) a notification or signal received from service-access-control system 104. In an embodiment, first communication device 102 transmits the first data payload in response to (i) the first communication device 102 entering a zone near (or within a predefined vicinity of) the point-of-service terminal 106—wherein the distance between the first communication device and the point-of-service terminal is in a range of between 1 and 1,000 metres, or (ii) the first communication device 102 receiving a wireless signal transmitted from the point-of-service terminal 106 or from an access point device 108 that is communicably coupled with the point-of-service terminal 106, or (iii) a time alarm or a location alarm or a notification generated within the first communication device 102 or received from service-access-control system 104.

In an embodiment, subsequent to detection of the trigger event, first communication device 102 initiates transmission of the first data payload to a destination network address—wherein the destination network address has been received by first communication device within one or more data packets received from point-of-service terminal 106 or from access point device 108. The destination network address may comprise a network address of point-of-service terminal 106 or of access point device 108.

In an embodiment, the first data payload may be associated with a user of first communication device 102, or with a user request for a specific user access, or for access to a specific service or specific instance of a service.

Point-of-service terminal 106 is configured to receive data from one or more user communication devices—and may store such data in a memory accessible to point-of-service terminal 106. The data received by point-of-service terminal 106 may comprise data transmitted by a first communication device 102 in response to detection of a trigger event—for example, the first data payload, and additionally, any biometric data associated with an authorized user or operator of first communication device 102. In an embodiment, biometric data associated with an authorized user or operator of first communication device 102 is included within the first data payload transmitted by a first communication device 102 in response to detection of a trigger event.

In an embodiment, point-of-service terminal 106 may be integrated with or communicably coupled with access point device 108.

Point-of-service terminal 106 is additionally configured to acquire one or more biometric samples associated with individuals or objects through one or more sensors that are integrated within, or coupled with, said point-of-service terminal 106. In an embodiment, the one or more sensors are configured and arranged so as to acquire at least one biometric sample of an individual or object present in a biometric sampling zone or a biometric capture region associated with point-of-service terminal 106. Further, point-of-service terminal 106 implements or performs a biometric comparison between (i) the acquired biometric sample(s) associated with an individual or object present in the biometric capture region and (ii) a set of biometric templates stored in a memory accessible by point-of-service terminal 106. The point-of-service terminal 106 may implement strategies to reduce the number of comparisons performed between the acquired biometric sample(s) and the set of biometric templates stored in a memory accessible by point-of-service terminal 106. An exemplary strategy may include reducing the set by checking distance of first communication devices from the point-of-service terminal 106, e.g., by measuring signal strength of the wireless communication signal. Another exemplary strategy may be to stop the comparison process when a match is found or use other filtering techniques to reduce the number of comparisons. The set of biometric templates stored in the memory accessible by point-of-service terminal 106 comprises biometric templates that have been transmitted by one or more first communication devices 102.

In an embodiment at least one of said biometric templates transmitted by a first communication device 102 is generated based on user biometric data associated with the user or operator of said first communication device 102. In an embodiment, said user biometric template or the user biometric data has been transmitted from the first communication device 102 to point-of-service terminal 106 in response to detection of a trigger event (of the kind described hereinabove) by the first communication device 102. In an embodiment, the user biometric data is transmitted from the first communication device 102, and is used by point-of-service terminal 106 to generate a user biometric template, which is stored among the set of biometric templates, in a memory accessible by point-of-service terminal 106. In another embodiment, the user biometric template is transmitted from the first communication device 102 to point-of-service terminal 106. The user biometric template or user biometric data may be transmitted from the first communication device 102 to point-of-service terminal 106 in response to detected trigger events (for example trigger events of a kind discussed above). In an embodiment, the set of biometric templates stored in the memory of point-of-service terminal 106 includes at least one additional biometric template that is distinct from the user biometric template. In an embodiment, the additional biometric template has been generated based on additional biometric data that is distinct from the user biometric data. In a more specific embodiment, the additional biometric template or the additional biometric data has been received by the point-of-service terminal 106, from a second communication device, wherein the second communication device is distinct from the first communication device 102 from which the user biometric template associated with the user has been received.

In a specific embodiment of the invention, the data within the first data payload (that is based on the first data block and that is transmitted from first communication device 102 to point-of-service terminal 106) comprises the user biometric template or the user biometric data that is received at the point-of-service terminal 106 from the first communication device 102. In another embodiment of the invention, the first data payload comprises (i) the data that is based on the first data block, and (ii) the user biometric template or the user biometric data that is received at the point-of-service terminal from the first communication device 102. In yet another embodiment of the invention, the user biometric template or the user biometric data is transmitted from first communication device 102 to the point-of-service terminal 106 within an additional data payload that is distinct from the first data payload.

In an embodiment, point-of-service terminal 106 may be configured to check acquired biometric samples for liveness, genuineness or spoofing to eliminate any illegitimate attempts to bypass the biometric security system(s). In an embodiment, point-of-service terminal 106 may be configured to compare an acquired biometric sample with a set of biometric templates stored in the point-of-service terminal 106 memory, wherein the set of biometric templates contain biometric data of individuals who are prevented from accessing the service (a "negative list") and generate a signal upon a positive match decision, wherein the generated signal is used to generate an alert or prevent any illegitimate attempt by previously known unauthorised persons to bypass the biometric security system(s). In this embodiment, the biometric templates in the negative list are distinct from the biometric templates of one or more legitimate users received from first communication device(s) 102.

Point-of-service terminal 106 is also configured for transmitting a second data payload to service-access-control system 104—wherein data within the second data payload is based on data within the first data payload. In an embodiment, data within the second data payload is identical to data within the first data payload. In another embodiment, data within the second data payload is data extracted from data within the first data payload. In another embodiment, data within the second data payload is output from an implemented data processing function that has received data within the first data payload as an input. For the purposes of the present invention the "second data payload" may comprise any part of data or data packet(s) transmitted from point-of-service terminal 106 to service-access-control system 104, other than data that is included only to enable delivery of the transmitted data or data packet(s).

In one embodiment, point-of-service terminal 106 transmits the second data payload to service-access-control system 104 in response to the biometric comparison resulting in a positive match decision. As a consequence, receipt of a second data payload at service-access-control system 104 signals to service-access-control system 104 that a biometric comparison has resulted in a positive match, and that data within the received second data payload corresponds to data within a first data payload (and therefore to data within a first data block) that is (i) associated with a user whose biometric identity has resulted in the positive match decision, or (ii) associated with a request from such user for a specific user access, or for access to a specific service or specific instance of a service. In this embodiment, point-of-service terminal 106 either itself generates a match decision (i.e. a positive match decision or a negative match decision) based on output from the biometric comparison, or initiates generation of a match decision at another device and receives the match decision from such device.

In an alternative embodiment, point-of-service terminal 106 transmits to service-access-control system 104, an output of each biometric comparison between (i) each acquired biometric sample(s) associated with an individual or object present in the biometric capture region and (ii) each biometric template within a set of or a subset of biometric templates stored in a memory accessible by point-of-service terminal 106. For each transmitted output of a biometric comparison(s), point-of-service terminal 106 additionally generates and transmits (to service-access-control system 104) a corresponding second data payload—wherein data within said second data payload is based on data within a first data payload that has been received at point-of-service terminal 106, and that is associated with the specific biometric template against which the acquired biometric sample has been compared. Stated differently, data within the second data payload corresponding to a transmitted output of a biometric comparison is based on data within a first data payload that has been received (at the point-of-service terminal 106 from a first communication device 102) along with, or corresponding to, the biometric template that is used as an input for the biometric comparison between a biometric template and an a biometric sample acquired or captured at point-of-service terminal 106.

As a result, in this embodiment, for each biometric sample acquired by a point-of-service terminal 106, the point-of-service terminal 106 transmits to service-access-control system 104, (i) a set of outputs of biometric comparisons, comprising a discrete output arising out of each comparison between the acquired biometric sample and each of the biometric templates within the set of or a subset of biometric templates stored in the memory accessible by the point-of-service terminal 106, and (ii) for each discrete output of a biometric comparison transmitted to service-access-control system 104, a second data payload comprising data that is based on data within a first data payload that is associated with a biometric template that has been used as an input for the biometric comparison that resulted in said discrete output. In this embodiment, service-access-control system 104 either itself generates a match decision (i.e. a positive match decision or a negative match decision) based on the set of outputs from the biometric comparison it received from the point-of-service terminal 106, or initiates generation of a match decision at another device based on the set of outputs from the biometric comparison it received from the point-of-service terminal 106 and receives the match decision from such device.

In addition to the above, in certain embodiments, point-of-service terminal 106 may have integrated therewithin, or may be coupled with, an access control device 112 wherein the access control device 112 may be configured to restrict or control access to a product or service or location. In such embodiments, point-of-service terminal may be configured to receive from service-access-control system 104, a control signal authorizing a user's access to a product, service or location that is restricted by access control device 112—and may in turn operate or initiate operation of access control device 112 to permit the user to access the product, service or location.

In various non-limiting embodiments, the access control device 112 may comprise any of a portable computer, tablet computer, phablet, cellular phone, smartphone, personal digital assistant, a point-of-sale terminal, a point-of-sale kiosk, a cash register, a vending machine or vending cabinet, an electronic door lock, a checkpoint device, a security barrier, or a gate control device that controls or selectively permits access of authorized individuals into a restricted access area (e.g. into a venue for a sporting event, a flight, a vehicle rental, a lodging rental, a concert, a performance, a movie, public transport, and so on), or the like.

Service-access-control system 104 is configured to receive at least a second data payload transmitted by point-of-service terminal 106, and to perform a computation involving data within the second data payload and a second data block stored in a memory accessibly by service-access-control system 104, wherein the computation may include comparison, addition, subtraction, multiplication, division, or other computational functions such as encryption, decryption, and cryptographic functions, or a combination thereof. Responsive to a determination (based on an output of the computation) that establishes a correlation between the second data payload and the second data block, it can be concluded that the second data payload has been generated based on data within a first data block corresponding to the second data block (since the second data payload is generated based on a first data payload that is in turn generated based on a first data block). By additionally establishing that the second data payload corresponds to (or is associated with) a biometric comparison that has resulted in a positive match decision, it can be concluded that a user whose acquired biometric has resulted in the positive match decision, is in fact a user who has been authorized by service-control-access system 104 to avail of a service that is access controlled by point-of-service terminal 106.

Accordingly, service-access-control system 104 is configured to respond to a determination that (i) an output of a computation involving data within a received second data payload and a second data block stored in a memory accessible by service-access-control system 104 has resulted in identification of a correlation between said second data payload and said second data block, and (ii) also that said second data payload corresponds to (or is associated with) a biometric comparison that has resulted in a positive match decision—by generating a control signal authorizing access, or recording access, of a user whose acquired biometric has resulted in the positive match decision, to a product, service or location that is controlled or restricted by point-of-service terminal 106 and/or by access control device 112. Service-access-control system 104 may be configured to transmit the control signal to point-of-service terminal 106 and/or access control device 112.

As described above, in one embodiment of the invention, point-of-service terminal 106 only transmits a second data payload to service-access-control system 104 in response to a biometric comparison resulting in a positive match decision. As a consequence, in this embodiment, service-access-control system 104 is configured to respond to receipt of a second data payload from point-of-service terminal 106, by generating and transmitting the control signal to point-of-service terminal 106 and/or access control device 112.

As described above, in an alternate embodiment, point-of-service terminal 106 and/or access control device 112 is configured such that for each biometric sample acquired by a point-of-service terminal 106, the point-of-service terminal 106 transmits to service-access-control system 104, (i) a set of outputs of biometric comparisons, comprising a discrete output arising out each comparison between the acquired biometric sample and each of the biometric templates within the set of biometric templates stored in the memory accessible by the point-of-service terminal 106, and (ii) for each discrete output of a biometric comparison transmitted to service-access-control system 104, a second data payload comprising data that is based on data within a first data payload that is associated with a biometric template that has been used as an input for the biometric comparison that resulted in said discrete output.

In this embodiment, service-access-control system 104 is configured to respond to a determination that (i) an output of a computation involving data within a received second data payload and a second data block stored in a memory accessible by service-access-control system 104 has resulted in identification of a correlation between said second data payload and said second data block, and (ii) also that said second data payload corresponds to (or is associated with) a biometric comparison that has resulted in a positive match decision—by generating a control signal authorizing access, or recording access, of a user whose acquired biometric has resulted in the positive match decision, to a product, service or location that is controlled or restricted by point-of-service terminal 106 and/or by access control device 112. Service-access-control system 104 may be configured to transmit the control signal to point-of-service terminal 106 and/or access control device 112.

Figure 3:
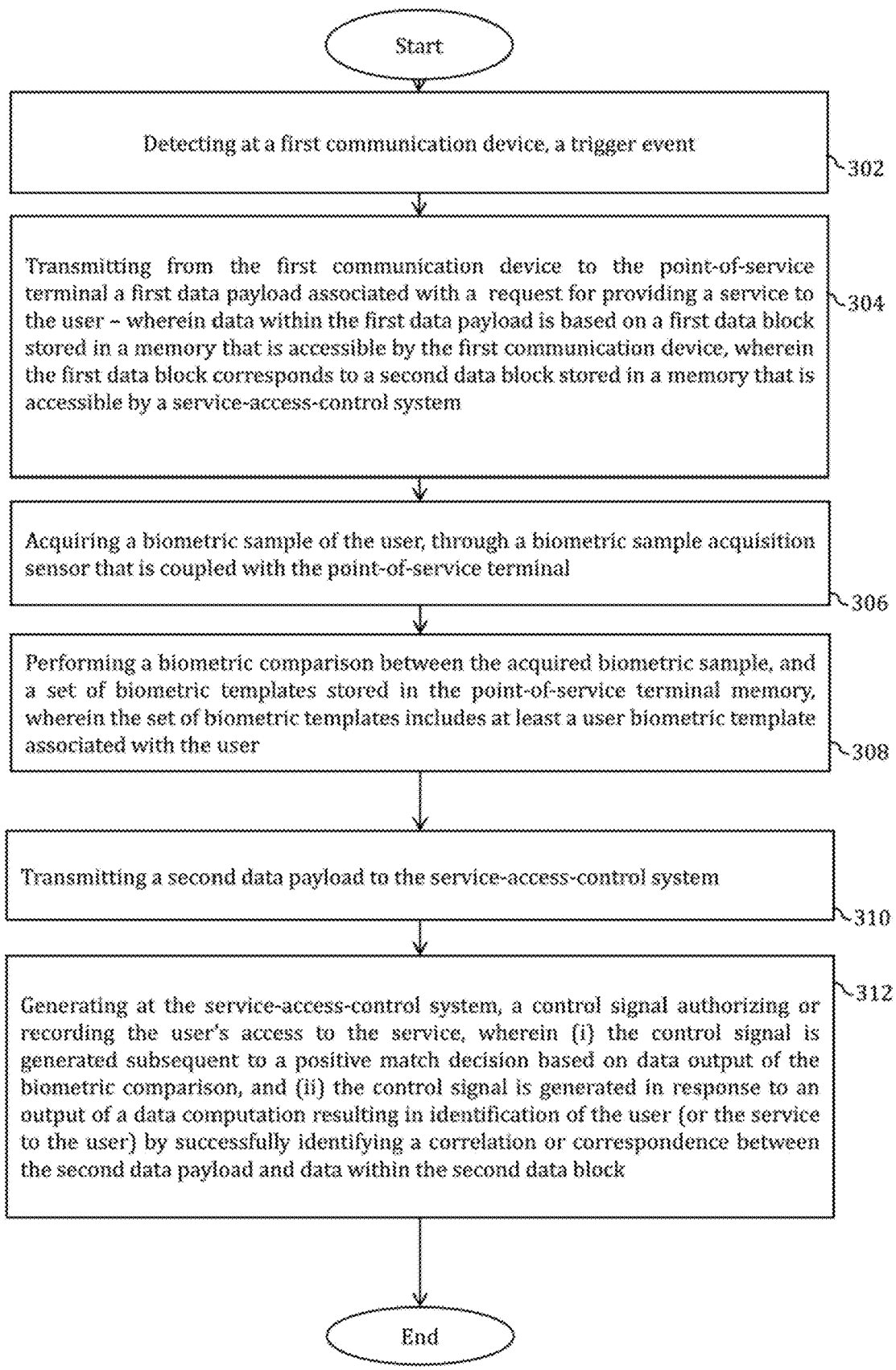
FIG. 3 is a flowchart illustrating a method for biometric identity authentication at a point-of-service terminal, in accordance with the teachings of the present invention.

FIG. 3 is a flowchart illustrating a method for monitoring or controlling a user's access to a service at a point-of-service terminal, in accordance with the teachings of the present invention. The method of FIG. 3 may be performed within system environment 100 as shown in FIG. 1 and/or FIG. 2. In an embodiment, the system elements of system environment 100 may be configured in accordance with the description for said system elements that has been provided above. In a particular embodiment, first communication device 102, point-of-service terminal 106, and service-access-control system 104 may be configured in accordance with one or more of the invention embodiments described above.

The method of FIG. 3 commences at step 302—which comprises, detecting a trigger event at a first communication device 102. The trigger event is an event that first communication device 102 is configured to recognize as a signal to initiate transmission of enrolled biometric data (for example, a biometric template) associated with an authorized user or operator of first communication device 102, from first communication device 102 to a point-of-service terminal 106.

In an embodiment, the trigger event that is detected by first communication device 102 may comprise receiving at first communication device, a predefined wireless signal (for example a beacon signal) that is transmitted from point-of-service terminal 106 or from an access point device 108. In other embodiments, the trigger event that is detected by first communication device 102 may comprise any of (i) a triggered time based alarm or alert, (ii) a triggered location based alarm or alert, or (iii) a notification or signal received from service-access-control system 104, or (iv) first communication device 102 entering a zone near (or within a physical vicinity of) point-of-service terminal 106, wherein the distance between the first communication device 102 and the point-of-service terminal 106 is in a range between 1 and 1,000 metres.

At step 304, subsequent to detection of the trigger event, first communication device 102 transmits to point-of-service terminal 106 a first data payload associated with a request for providing a service to the user—wherein data within the first data payload is based on a first data block stored in a memory of (or in a memory accessible by) first communication device 102, and wherein the first data block corresponds to a second data block stored in a memory that is accessible by a service-access-control system 104.

First communication device 102 also transmits to point-of-service terminal 106, a user biometric template or user biometric data that is associated with a user or operator of first communication device 102. In an embodiment the user biometric template or user biometric data is retrieved from a memory of first communication device 102 for transmission to point-of-service terminal 106.

In a specific embodiment of step 304 of the method, the data within the first data payload (that is based on the first data block and that is transmitted from first communication device 102 to point-of-service terminal 106) comprises the user biometric template or the user biometric data In another embodiment, the first data payload transmitted at step 304 comprises (i) the data that is based on the first data block, and (ii) the user biometric template or the user biometric data. In yet another embodiment, in addition to transmission of the first data payload, step 304 additionally comprises transmission of the user biometric template or the user biometric data from first communication device 102 to point-of-service terminal 106 within an additional data payload that is distinct from the first data payload.

In an embodiment of step 304, where first communication device 102 transmits user biometric data to point-of-service terminal 106, said point-of-service terminal 106 may generate a user biometric template based on the received user biometric data and may store said user biometric template among a set of biometric templates, in a memory accessible by point-of-service terminal 106.

Step 306 comprises initiating or performing at point-of-service terminal 106, the step of acquiring a biometric sample of the user, through a biometric sample acquisition sensor(s) that is controlled by, coupled with or integrated within point-of-service terminal 106. In an embodiment, the biometric sample acquisition sensor(s) are configured and arranged so as to acquire at least one biometric sample for an individual or object present in a biometric sampling zone or a biometric capture region associated with point-of-service terminal 106.

Step 308 comprises performing a biometric comparison between the acquired biometric sample, and a set of biometric templates stored in the point-of-service terminal memory, wherein the set of biometric templates includes at least a user biometric template associated with the user (and which has been transmitted to or generated by point-of-service terminal 106 in accordance with the teachings of method step 304). In an embodiment, the set of biometric templates stored in the memory accessible by point-of-service terminal 106 comprises biometric templates that have been transmitted by one or more user communication devices and/or biometric templates that have been generated based on biometric data that has been transmitted by one or more user communication devices. The biometric comparison may comprise a comparison based on one or more biometric comparison methods or algorithms and may generate as an output, an encrypted or unencrypted biometric comparison result or biometric comparison output. The biometric comparison may be performed or initiated by point-of-service terminal 106. In an embodiment, the set of biometric templates stored in the memory of point-of-service terminal 106 includes at least one additional biometric template that is distinct from the user biometric template. In an embodiment, the additional biometric template has been generated based on additional biometric data that is distinct from the user biometric data. In a more specific embodiment, the additional biometric template or the additional biometric data has been received by the point-of-service terminal 106, from a second communication device, wherein the second communication device is distinct from the first communication device 102 from which the user biometric template associated with the user has been received.

Step 310 comprises transmitting a second data payload from point-of-service terminal 106 to service-access-control system 104—wherein data within the second data payload is based on data within the first data payload. In an embodiment, data within the second data payload is identical to data within the first data payload. In another embodiment, data within the second data payload is data extracted from data within the first data payload. In another embodiment, data within the second data payload is an output from an implemented data processing function that has received data within the first data payload as an input.

Step 312 of the method comprises generating at service-access-control system 104, a control signal authorizing providing of the service to the user, or recording user access to the service, wherein (i) the control signal is generated subsequent to a positive match decision based on data output of the biometric comparison, and (ii) the control signal is generated in response to an output of a data computation resulting in identification of the user (or the service to the user) by successfully identifying a correlation or correspondence between the second data payload and data within the second data block. In an embodiment, the control signal is transmitted from service-access-control system 104 to point-of-service terminal 106 and/or access control device 112.

In an embodiment of the method of FIG. 3, point-of-service terminal 106 is configured for implementing the biometric comparison step, as well as the step of generating (or receiving from another device) a match decision based on the results of the biometric comparison. In a more particular embodiment thereof, point-of-service terminal is configured such that each second data payload that is transmitted from point-of-service terminal 106 to service-access-control system 104 at step 310, is a second data payload that has been generated based on a first data payload—wherein said first data payload has been transmitted at step 304 from a first communication device 102 that has also transmitted a user biometric template, and wherein the transmitted user biometric template has generated a positive match decision when compared against a biometric sample acquired at step 306.

Figure 4:
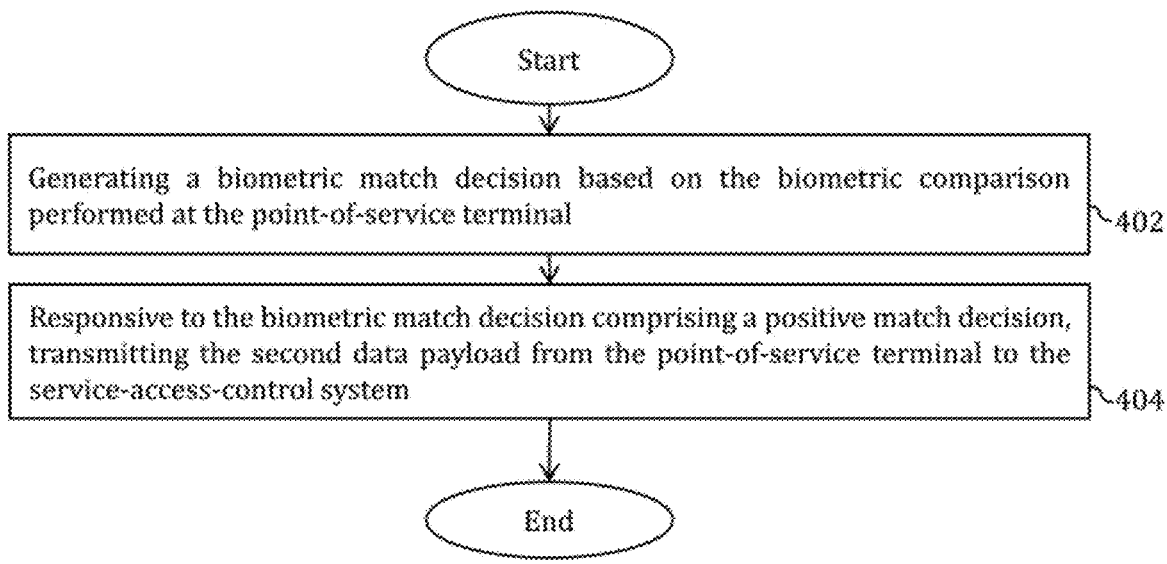
FIG. 4 is a flowchart illustrating a first embodiment of particular method steps involved in the method of FIG. 3, wherein a match decision based on biometric comparisons implemented at the point-of-service terminal, is implemented at the point-of-service terminal.

FIG. 4 is a flowchart illustrating particular method steps involved in this embodiment, wherein a match decision based on biometric comparisons performed at point-of-service terminal 106, is generated at point-of-service terminal 106. In one embodiment, the method steps of FIG. 4 may be implemented within a particular embodiment of steps 308 to 312 of the method of FIG. 3.

At step 402, subsequent to, or as part of, the biometric comparison at step 308, point-of-service terminal 106 generates a biometric match decision based on the biometric comparison performed at point-of-service terminal 106. The biometric match decision may either comprise a positive match decision (i.e. that the acquired biometric sample is deemed sufficiently similar when compared with at least one biometric template within the set of biometric templates) or a negative match decision (i.e. that the acquired biometric sample is deemed sufficiently dissimilar from every biometric template within the set of biometric templates).

At step 404, responsive to the biometric match decision comprising a positive match decision, point-of-service terminal 106 transmits the second data payload from the point-of-service terminal to the service-access-control system (as described in method step 310).

The method of FIG. 3 may thereafter proceed to implementation of method step 312.

In an alternative embodiment of the method of FIG. 3, point-of-service terminal 106 is configured for implementing or initiating the biometric comparison step, and for forwarding output from each biometric comparison, irrespective of (or agnostic to) whether the biometric comparison results in a positive match decision. In this implementation, outputs corresponding to every biometric comparison between an acquired biometric sample and a biometric template stored in a memory accessible by point-of-service terminal 106, are transmitted from point-of-service terminal 106 to service-access-control system 104 at step 310, along with discrete second data payloads respectively corresponding to each said comparison, wherein each such discrete second data payload has been generated based on a first data payload that has been transmitted at step 304 from a discrete first communication device 102 that has also transmitted the specific user biometric template that has been used as an input in said comparison at step 306. In this embodiment, the match decision corresponding to each forwarded biometric comparison output is performed or implemented by service-access-control system 104. Responsive to a positive match decision, service-access-control system 104 analyses or processes (or implements a data computation involving) the second data payload that has been transmitted along with or associated with said biometric comparison output (which has resulted in the positive match decision)—for identifying a correlation or correspondence between the second data payload and data within a second data block stored in a memory accessible to service-access-control system 104.

Figure 5:
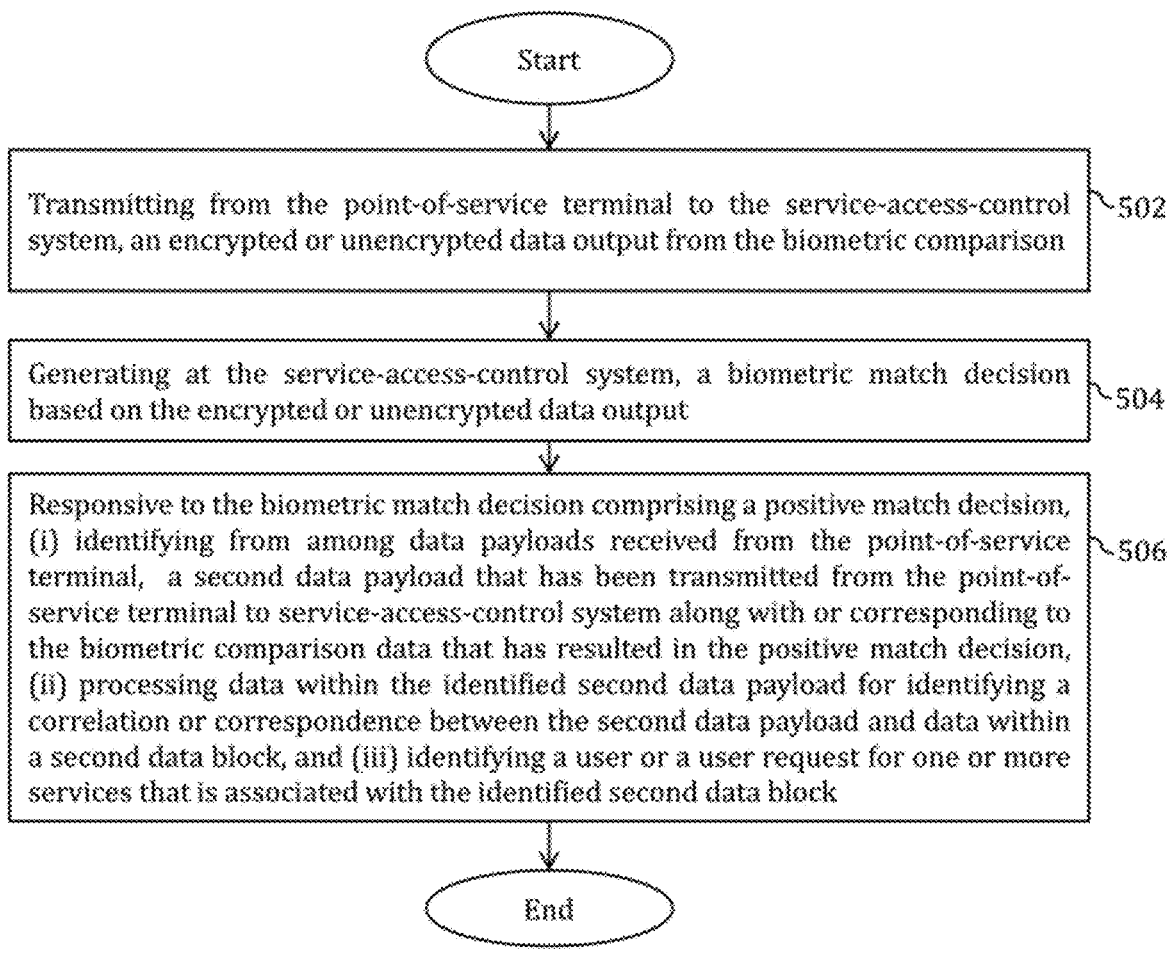
FIG. 5 is a flowchart illustrating another embodiment of particular method steps involved in the method of FIG. 3, wherein a match decision based on biometric comparisons implemented at the point-of-service terminal, is generated at a service-access-control system.

FIG. 5 is a flowchart illustrating particular method steps involved in this alternate embodiment, wherein a match decision based on biometric comparisons performed at the point-of-service terminal 106, is generated or initiated at a service-access-control system 104. In one embodiment, the method steps of FIG. 5 may be implemented within a particular embodiment of steps 308 to 312 of the method of FIG. 3.

Step 502 comprises transmitting from the point-of-service terminal 106 to the service-access-control system 104, an encrypted or unencrypted data output from the biometric comparisons that have been performed at step 308. In a particular embodiment, a discrete output corresponding to every biometric comparison between an acquired biometric sample and a biometric template stored in a memory accessible by point-of-service terminal 106), that is performed at step 308, is transmitted from point-of-service terminal 106 to service-access-control system 104 at step 310, along with a second data payload corresponding to each transmitted biometric comparison, wherein such second data payload has been generated based on a first data payload that has been transmitted at step 304 from a first communication device 102 that has also transmitted the user biometric template that has been used as an input in said comparison at step 306.

For each encrypted or unencrypted data output forwarded at step 502, step 504 comprises generating at service-access-control system 104, a biometric match decision based on the encrypted or unencrypted data output. In a specific embodiment where the biometric match decision is generated based on encrypted data, the encrypted data may first be decrypted and the generated biometric match decision may be based on the decrypted data. In other embodiments, the biometric match decision may be based on the encrypted data, without first having to decrypt said data.

At step 506, responsive to the biometric match decision (at step 504) comprising a positive match decision, service-access-control system 104 identifies from among data payloads received from point-of-service terminal 106, a second data payload that has been transmitted (from point-of-service terminal 106) to service-access-control system 104 along with or corresponding to the biometric comparison data that has resulted in the positive match decision. Service-access-control system 104 thereafter analyses or processes (or implements a data computation involving) the identified second data payload for identifying a correlation or correspondence between the second data payload and data within a second data block stored in a memory accessible to service-access-control system 104. Once a correlated or corresponding second data block is thus identified, service-access-control system 104 identifies a user or a user request for one or more services that is associated with the identified second data block. This identification of a user or user request for one or more services is made possible since (as described above) when provisioning a first communication device 102 and/or a service-access-control system 104, at least one of a second data block or a corresponding first data block that are being respectively provisioned in service-access-control system 104 and first communication device 102 are associated with the user, or with a request from the user or from the first communication device 102, for accessing or receiving one or more services. Thus by identifying a second data block that has been correlated with a positive match decision generated by service-access-control system 104, it is possible to correlate the positive match decision with a user request for one or more services—and as a consequence of the positive match decision, it is also possible to confirm that the user who has generated the user request is in fact present at the point-of-service terminal 106. Therefore, as a result of the above implementation, service-access-control system 104 may at step 312 (of the method of FIG. 3) generate a control signal authorizing providing of the requested service to the user—and may transmit this control signal to the point-of-service terminal 106 or alternatively to an access control device 112.

The following details of the implementations of the invention are described in connection with FIGS. 1 to 5.

In an embodiment, a first data payload generated by first communication device 102 includes current timestamp (t). Service-access-control system 104 extracts data from the transmitted second data payload and determines whether the value of timestamp (t) falls within a predefined acceptable time interval from when a user of first communication device 102 initiated the request for access to the service by responding to a trigger event. Service-access-control system 104 generates control signal authorizing providing the service to the user, on a condition that the value of timestamp (t) falls within the predefined acceptable time interval.

In an embodiment, the data in the first data payload may be encrypted using an asymmetric cryptographic algorithm with the cryptographic key K1. Service-access-control system 104 extracts data from the transmitted second data payload, decrypts the data with the cryptographic key K2 and uses this data in identification of the user and/or generating a control signal authorizing providing of the service to the user. In an embodiment a corresponding pair of asymmetric encryption algorithm keys K1 and K2 could be shared between the service-access-control system 104 and the first communication device 102. In an embodiment, K1 could be a public key and K2 could be a private key. In another embodiment, K1 could be a private key and K2 could be a public key.

In an embodiment, a symmetric cryptographic key K is shared between the service-access-control system 104 and the first communication device 102. The data in the first data payload is encrypted using a symmetric cryptographic algorithm with the cryptographic key K. Service-access-control system 104 extracts data from the transmitted second data payload, decrypts the data with the cryptographic key K and uses this data for identification of the user and/or in a condition for generating a control signal authorizing providing of the service to the user.

In an embodiment, the service-access-control system 104 has access to the secret key SK for the homomorphic encryption, the first communication device 102 has access to the corresponding public key PK and the point-of-service terminal 106 has access to the corresponding evaluation key EK. The first communication device 102 homomorphically encrypts the biometric template using the public key PK, and sends it in the first data payload. In the step 308 the point-of-service terminal 106 performs the biometric comparison in the encrypted domain using the evaluation key EK. In the step 504 the service-access-control system 104 homomorphically decrypts the biometric comparison result and uses it to generate match/non-match decision.

In an embodiment, a user of first communication device 102 provisions the first communication device 102 with a Document Security Object (SOD), a Data Group 1 (DG1) data object and a Data Group 2 (DG2) data object corresponding to a user's passport or ID card by communicating with an NFC chip within a biometric passport or ID card and receiving the above data objects from the NFC chip.

In an embodiment the point-of-service terminal 106 receives the DG2 data object and the SOD as the part of the first data payload, and checks the authenticity of the biometric data contained in the DG2 data object using SOD, as a condition for performing a biometric comparison, and/or for authorizing providing of the requested service to the user.

In another embodiment the point-of-service terminal 106 receives the DG2 data object in the first data payload, and send the hash of DG2 as a part of the second data payload. The service-access-control system 104 stores the hash of DG2 from the SOD as a part of the second data block, and compares it with the hash of DG2, received in the second data payload. Equality of the two hashes is used as a condition for authorizing providing of the requested service to the user.

In an embodiment, service-access-control system 104 uses the SOD to determine authenticity of the data contained in the DG1 data object as a condition for authorizing providing of the requested service to the user.

First Exemplary Embodiment

A first exemplary implementation of the invention more generally described in connection with FIGS. 1 to 5, is provided below. In this embodiment, implementation commences with a user of first communication device 102 initiating a request for accessing or receiving a service for which, access is controlled by service-access-control system 104. A secure communication session (e.g., over https protocol) is initiated between first communication device 102 and service-access-control system 104. Within the secure communication session, service-access-control system 104 authenticates an identity of the user who has raised the request, and subject to successful user identity authentication, first communication device 102 is provisioned with the first data block while service-access-control system 104 (or a memory accessible by service-access-control system 104) is provisioned with a second data block—wherein the first data block corresponds to the second data block and the correspondence between the first data block and the second data block is defined by a set of one or more predefined functions. For example, both the first data block and the second data block are equal to a secure random number X associated with the user account.

First communication device 102 is or has already been provisioned with an enrolled biometric corresponding to the user—wherein the enrolled biometric is stored as a biometric template in a memory of first communication device 102.

When the first communication device 102 is within a defined physical proximity (e.g. within a location radius of 1,000 metres) of a point-of-service terminal 106 at which access to the requested service is available, first communication device 106 establishes a secure communication session with point-of-service terminal 106. First communication device 102 may ascertain that it is within the defined physical proximity in any number of different ways, including based on GPS data, or based on receipt of a short-range beacon signal from point-of-service terminal 106 or from an access-point device 108 that is itself in a defined proximity to point-of-service terminal 106.

First communication device 102 may authenticate point-of-service terminal 106 to ascertain that said point-of-service terminal 106 is a terminal that is authorized to provide or to control access to the requested service.

First communication device 102 generates a first data payload comprising a cryptographic hash of the first data block (x) and a current timestamp (t), i.e. H(x,t). The first data payload and the biometric template corresponding to the user are transmitted from first communication device 102 to point-of-service terminal 106. The biometric template may be transmitted from first communicate device 102 within the first data payload or within an additional data payload. Point-of-service terminal 106 may in turn be configured to discard the received biometric template and/or the corresponding first data payload after a predefined time interval (for example, 1 hour) from when they were received from a first communication device 102.

Point-of-service terminal 106 subsequently collects a live biometric sample from the user, while the user is present in a biometric sampling zone or a biometric capture region associated with point-of-service terminal 106. The live biometric sample is compared against biometric template data that has been received by point-of-service terminal 106 from one or more user communication devices. If a positive match is not found, the user present in the biometric sampling zone or a biometric capture region associated with point-of-service terminal 106 is not granted access to the requested service/service provided at point-of-service terminal 106. If a positive match is found (i.e. a positive match decision is generated), point-of-service terminal 106 transmits a second data payload comprising the cryptographic hash of the first data block H(x,t) to service-access-control system 104 over a secure communication session initiated between point-of-service terminal 106 and service-access-control system 104.

Service-access-control system 104 extracts data from the transmitted second data payload and determines whether the value of timestamp (t) that has been used to generate cryptographic hash (H(x,t)) falls within a predefined acceptable time interval from when a user of first communication device 102 initiated the request for access to the service by responding to a trigger event. In response to a determination that the value of timestamp (t) falls within the predefined value of timestamp (t), service-access-control system 104 searches for a second data block that is computationally determined to match or correspond to data within cryptographic hash H(x,t) that has been received from point-of-service terminal 106. In this example, for each user account the service-access-control system 104 retrieves $x_i$, computes $H(x_i,t)$, and compares it with H(x,t) received. If the two values are equal, the match is found. If a matching or corresponding second data block is found, the identity of the user is confirmed, and service-access-control system 104 generates a control signal instructing point-of-service terminal 106 (or an access control device 112) to permit the user present in the biometric sampling zone or a biometric capture region associated with point-of-service terminal 106 to receive access to the requested service/service provided at point-of-service terminal 106. If no such match or corresponding second data block is found, access is not provided to said user.

Second Exemplary Embodiment

A second exemplary implementation of the invention more generally described in connection with FIGS. 1 to 5, is provided below.

In this embodiment, implementation commences with a user of first communication device 102 provisioning first communication device 102 with a Document Security Object (SOD), a Data Group 1 (DG1) data object and a Data Group 2 (DG2) data object corresponding to a user's passport or ID card by communicating with an NFC chip within a biometric passport or ID card and receiving the above data objects from the NFC chip.

First communication device 102 thereafter initiates a request for accessing or receiving a service for which, access is controlled by service-access-control system 104. A secure communication session is initiated between first communication device 102 and service-access-control system 104. Within the secure communication session, service-access-control system 104 authenticates an identity of the user who has raised the request. First communication device 102 transmits to service-access-control system 104 the SOD and the DG1 data object. Service-access-control system 104 validates the SOD using the digital signature from the issuing authority, and uses the SOD to verify the authenticity of data within the DG1 data object, and subject to successful verification, reads the hash of DG2 from the SOD, and stores it in the second data block associated with the user identified based on the data in the DG1 data object (e.g. based on the passport number, or on the name and date of birth).

First communication device 102 stores DG2 data object as a biometric template in a memory of first communication device 102.

When the first communication device 102 is within a defined physical proximity (e.g. within a location radius of 1,000 metres) of a point-of-service terminal 106 at which access to the requested service is available, first communication device 106 establishes a secure communication session with point-of-service terminal 106. First communication device 102 may ascertain that it is within the defined physical proximity in any number of different ways, including based on GPS data, or based on receipt of a short-range beacon signal from point-of-service terminal 106 or from an access-point device 108 that is itself in a defined proximity to point-of-service terminal 106.

First communication device 102 may authenticate point-of-service terminal 106 to ascertain that said point-of-service terminal 106 is a terminal that is authorized to provide or to control access to the requested service.

First communication device 102 generates a first data payload containing the DG2 data object (which serves as a biometric template) corresponding to the user and transmits it to the point-of-service terminal 106. Point-of-service terminal 106 computes the hash of data within the DG2 data object. Point-of-service terminal 106 may in turn be configured to discard the data within the first data payload after a predefined time interval (for example, 1 hour) from when they were received from a first communication device 102.

Point-of-service terminal 106 subsequently collects a live biometric sample from the user, while the user is present in a biometric sampling zone or a biometric capture region associated with point-of-service terminal 106. The live biometric sample is compared against biometric template data from the DG2 data object that has been received by point-of-service terminal 106 from one or more user communication devices and that had passed the authenticity check. If a positive match is not found (i.e. no match is found), the user present in the biometric sampling zone or a biometric capture region associated with point-of-service terminal 106 is not granted access to the requested service/service provided at point-of-service terminal 106. If a positive match is found (i.e. a positive match decision is generated), point-of-service terminal 106 transmits a second data payload comprising the hash of DG2 to service-access-control system 104 over a secure communication session initiated between point-of-service terminal 106 and service-access-control system 104.

Service-access-control system 104 determines whether the hash of DG2 from the transmitted second data payload matches any hash of DG2 corresponding to any user that is authorized to access a service controlled by service-access-control system 104. If a matching or corresponding SOD containing hash of DG2 is found, the identity of the user is confirmed, and service-access-control system 104 generates a control signal instructing point-of-service terminal 106 (or an access control device 112) to permit the user present in the biometric sampling zone or a biometric capture region associated with point-of-service terminal 106 to receive access to the requested service/service provided at point-of-service terminal 106. If no such match, access is not provided to said user.

Figure 6:
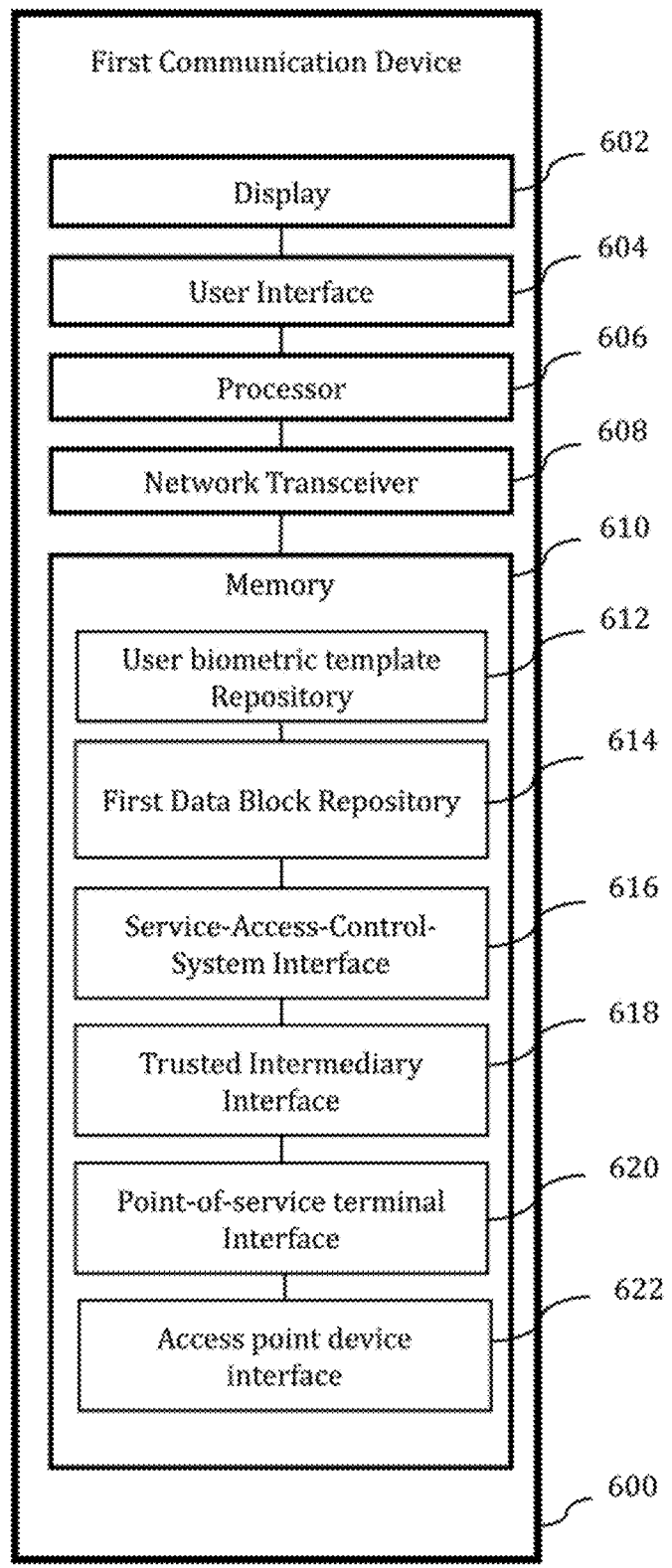
FIG. 6 illustrates an embodiment of a first communication device configured for implementing the teachings of the present invention.

FIG. 6 illustrates an example of a first communication device 600 configured for implementing the teachings of the present invention.

First communication device 600 may comprise any processor implemented instance of any processor based electronic communication device or communication terminal that is configured to implement data processing functionality, network communication functionality and/or wireless communication functionality, and one or more of the method steps described above in connection with FIGS. 3 to 5 described above. First communication device 600 comprises a display 602, a user interface 604, processor 606, network transceiver 608 and memory 610, which memory 610 may include transitory memory and/or non-transitory memory. In an exemplary embodiment, memory 610 may have stored therewithin one or more of, (i) an operating system (not shown) configured for managing device hardware and software resources and that provides common services for software programs implemented within first communication device 600, (ii) a user biometric template repository 612 configured for storage of encrypted or unencrypted enrolled biometrics/enrolled biometric templates, (iii) a first data block repository configured for storage of at least one first data block that have been generated during provisioning of the first communication device (as described in detail above)

and which corresponds to a second data block stored within a memory accessible by service-access-control system 104, (iv) a service-access-control system interface 616, which enables first communication device 600 to communicate with a service-access-control-system 104 for the purposes of implementing one or more methods of the present invention (for example the methods of any of FIGS. 3 to 5), (v) optionally, a trusted intermediary interface 618, which enables first communication device 600 to communicate with a trusted intermediary platform 110 for the purposes of enabling provisioning of first communication device 600 with a first data block, (vi) a point-of-service terminal interface 620, which enables first communication device 600 to communicate with a point-of-service terminal 106 for the purposes of implementing one or more methods of the present invention (for example the methods of any of FIGS. 3 to 5), and (vii) optionally, an access point device interface 622, which enables first communication device 600 to receive communications from an access point device 108 for the purposes of triggering transmission of biometric template data to access point device 108 or to point-of-service terminal 106 in accordance with the methods described in more detail hereinabove.

For the purposes of the present invention, it will be understood that a first communication device 102, 600 may be used by multiple authorized users (e.g. employees, dependent children etc.) and in such cases, each authorized user may be independently enrolled for biometric authentication with the device, resulting in multiple biometric templates being stored on the device, each corresponding to a specific user. Likewise in certain embodiments, the provisioning of a first communication device 102 and service-access-control system 104 may involve an instance of discrete provisioning process for each authorized user. In certain embodiments, for each authorized user using the same first communication device, there may be a distinct first and second data block pair stored on the first communication device 102 and the service-access-control system 104.

Figure 7:
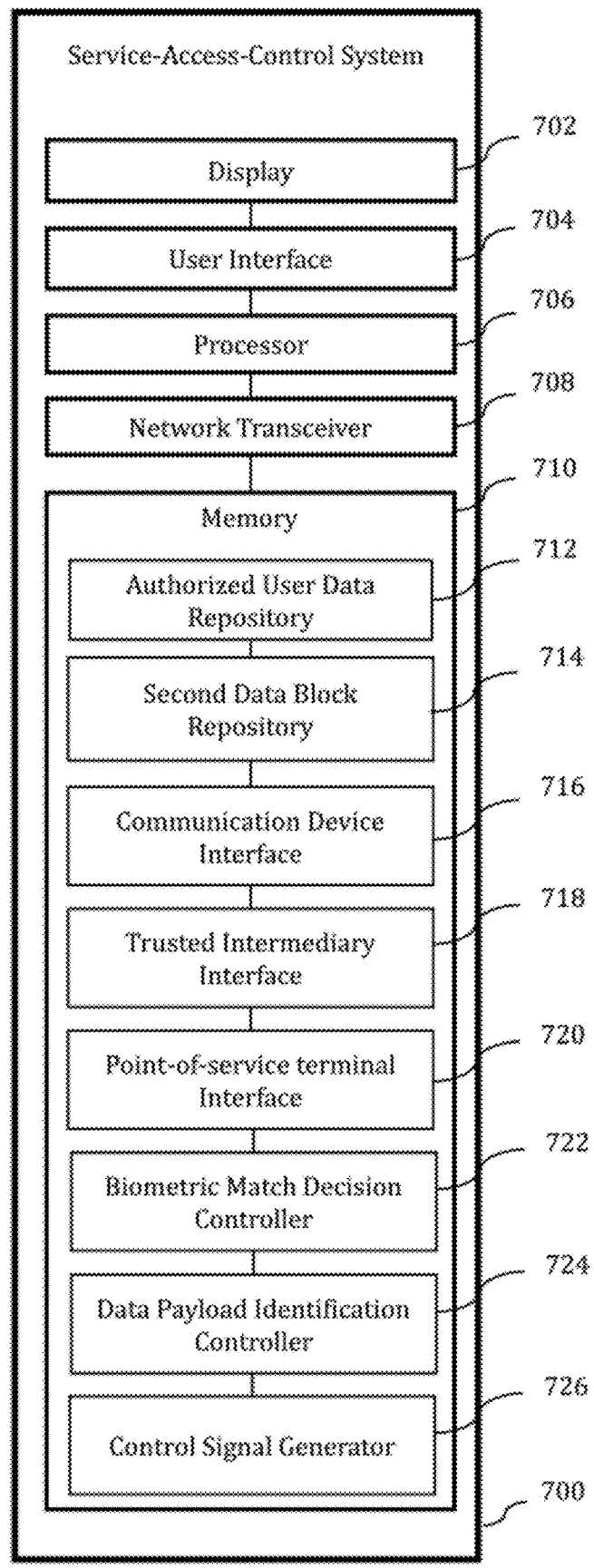
FIG. 7 illustrates an embodiment of a service-access-control system configured for implementing the teachings of the present invention.

FIG. 7 illustrates an example of a service-access-control system 700 configured for implementing the teachings of the present invention.

Service-access-control system 700 may comprise any processor implemented instance of any processor based electronic communication device or communication terminal that is configured to implement data processing functionality, network communication functionality and/or wireless communication functionality, and one or more of the method steps described above in connection with FIGS. 3 to 5 described above. Service-access-control system 700 comprises a display 702, a user interface 704, a processor 706, a network transceiver 708 and a memory 710, which memory 710 may include transitory memory and/or non-transitory memory. In an exemplary embodiment, memory 710 may have stored therewithin one or more of, (i) an operating system (not shown) configured for managing device hardware and software resources and that provides common services for software programs implemented within service-access-control system 700, (ii) an authorized user data repository 712 configured for storage of account data and/or profile data corresponding to user(s) enrolled for using the access control services of service-access-control system 700, (iii) a second data block repository configured for storage of at least one second data block that has been generated during the provisioning of the first communication device (as described in detail above) and which corresponds to a first data block stored within a memory accessible by a first communication device 102, (iv) a communication device interface 716, which enables service-access-control system 700 to communicate with a first communication device 102 (and with other communication devices) for the purposes of implementing one or more methods of the present invention (for example the methods of any of FIGS. 3 to 5), (v) optionally, a trusted intermediary interface 718, which enables service-access-control system 700 to communicate with a trusted intermediary platform 110 for the purposes of enabling provisioning of service-access-control system 700 with a second data block, (vi) a point-of-service terminal interface 720, which enables service-access-control system 700 to communicate with a point-of-service terminal 106 for the purposes of implementing one or more methods of the present invention (for example the methods of any of FIGS. 3 to 5), (vii) optionally, a biometric match decision controller 722 configured to implement method step 504 of the method of FIG. 5, (viii) optionally a data payload identification controller 724 configured to implement method step 506 of the method of FIG. 5, and (ix) a control signal generator 726 configured to generate a control signal in accordance with method step 312 of the method of FIG. 3. In an embodiment, the homomorphic secret key SK is accessible only to a biometric match decision controller 722, and is isolated from the rest of the access control system. In an embodiment, the biometric match decision controller 722 does not have access to, or cannot decrypt the data within the second data payload. In an embodiment, the biometric match decision controller 722 does not have access to the second data block.

Figure 8:
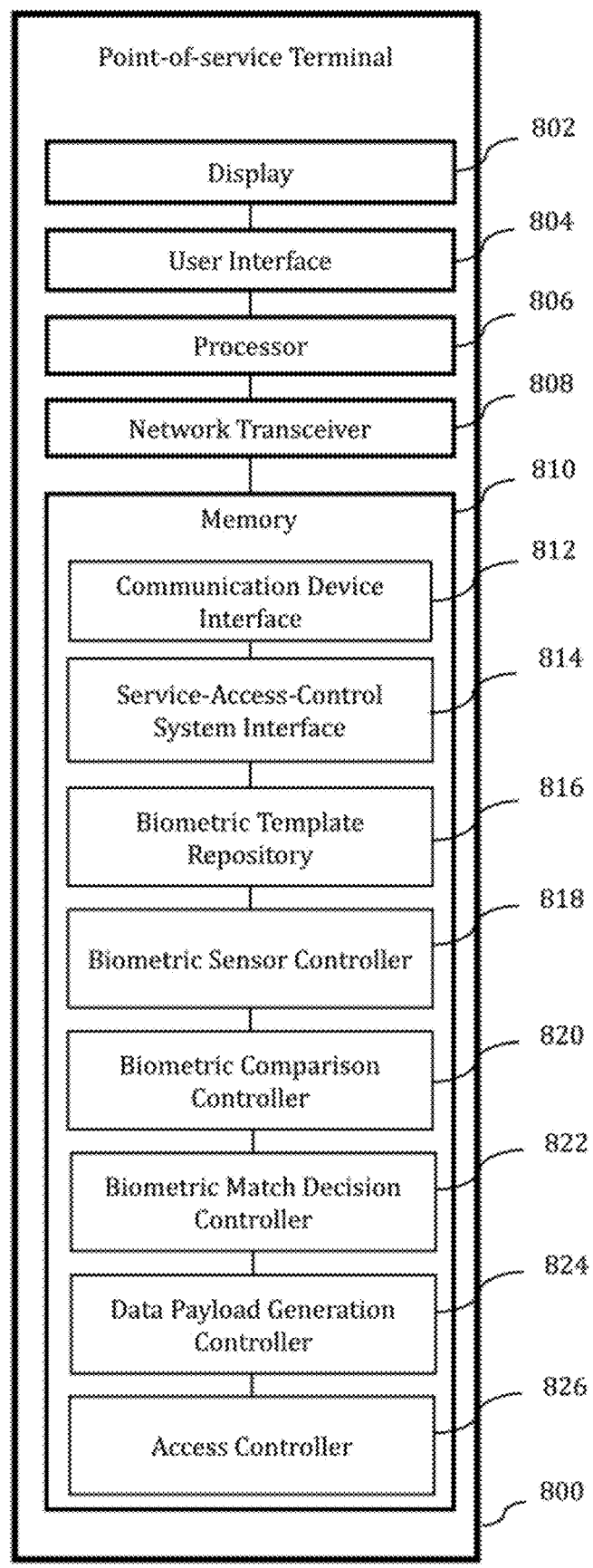
FIG. 8 illustrates an example of a point-of-service terminal configured for implementing the teachings of the present invention.

FIG. 8 illustrates an example of a point-of-service terminal 800 configured for implementing the teachings of the present invention.

Point-of-service terminal 800 may comprise any processor implemented instance of any may comprise any processor based electronic device or terminal that is configured to implement data processing functionality, biometric sample acquisition functionality, biometric comparison functionality, network communication functionality and/or wireless communication functionality, and one or more of the method steps described above in connection with FIGS. 3 to 5 described above. Point-of-service terminal 800 comprises a display 802, a user interface 804, a processor 806, a network transceiver 808 and a memory 810, which memory 810 may include transitory memory and/or non-transitory memory. In an exemplary embodiment, memory 810 may have stored therewithin one or more of, (i) an operating system (not shown) configured for managing device hardware and software resources and that provides common services for software programs implemented within point-of-service terminal 800, (ii) a communication device interface 812, which enables point-of-service terminal 800 to communicate with a first communication device 102 (and with other communication devices) for the purposes of implementing one or more methods of the present invention (for example the methods of any of FIGS. 3 to 5), (iii) a service-access-control system interface 814, which enables point-of-service terminal 800 to communicate with a service-access-control system 104 for the purposes of implementing one or more methods of the present invention (for example the methods of any of FIGS. 3 to 5), (iv) a biometric template repository 816 comprising a transitory or non-transitory memory configured to enable point-of-service terminal to retrievably store and access user biometric templates received from first communication device(s) 102, (v) a biometric sensor controller 818 configured to control the operation of one or more sensors for the purposes of acquiring biometric samples corresponding to an individual or object present in a biometric sampling zone or a biometric capture region associated with point-of-service terminal 800, (vi) a biometric comparison controller 820 configured to implement method step 308 of the method of FIG. 3, (vii) optionally, a biometric match decision controller 822 configured to implement method step 402 of the method of FIG. 4, (viii) a data payload generation controller 824 for generating second data payloads (in accordance with the teachings of the method of FIG. 3) for transmission to service-access-control system 104, and (ix) optionally, an access controller 826 configured to permit or restrict user access to a requested service by controlling operation of an access control device 112 that may integrated within or communicably coupled with point-of-service terminal 800.

Figure 9:
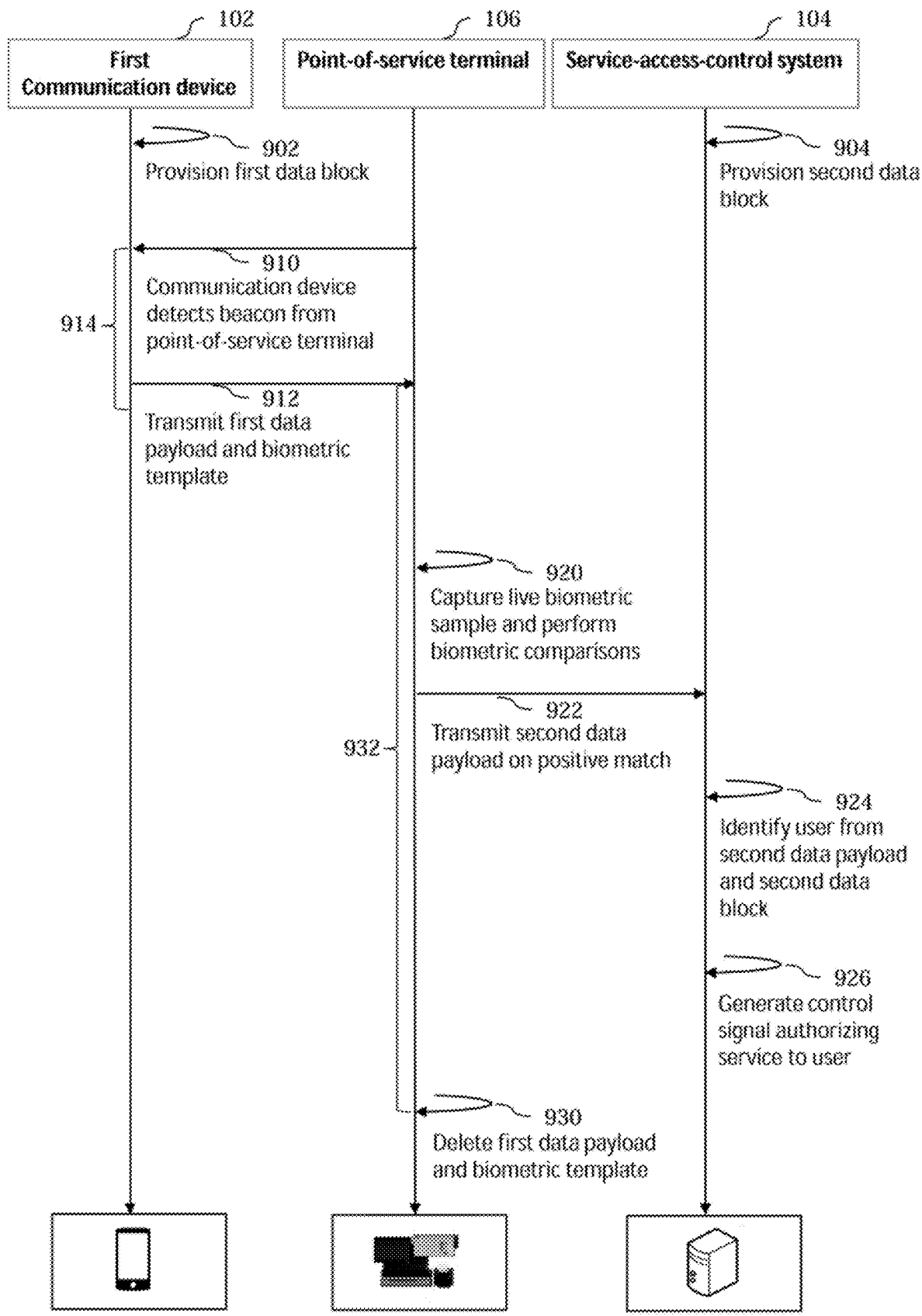
FIGS. 9 and 10 are communication flow diagrams illustrating non-limiting embodiments of implementations of methods in accordance with the teachings of the present invention.

FIG. 9 is a communication flow diagram illustrating a first implementation of a method according to the present invention. As shown, one or more of the steps of the method are performed (e.g., completely or partially, and/or the like) by the first communication device 102, the service-access-control system 104, and the point-of-service terminal 106. In the illustrated communication flow diagram, the point-of-service terminal 106 cannot decipher any personally identifying information of the user other than the user's biometric data or biometric template, thus providing privacy protection to the user.

As shown in FIG. 9, at step 902, prior to enabling access to a service to the user, a first data block is provisioned in first communication device 102. In one embodiment, a user downloads an application from an application store onto his/her smartphone. The application prompts the user to point the smartphone's camera to the bottom of the first page of his/her passport. The application then takes a picture or a video of the passport page and reads the information in the machine readable zone (MRZ) of the passport using optical character recognition (OCR). Alternatively, the application may take a picture or video of the first page of the passport and read the textual information using OCR. The application subsequently prompts the user to touch the back of his/her smartphone which incorporates an NFC antenna to the back cover of the passport which incorporates the contactless secure chip of the passport. The application reads the data from the secure chip and provisions the first data block in the user's smartphone based on the user's passport number and user's profile photo (biometric data) read from the passport's chip.

As shown in FIG. 9, at step 904, prior to enabling access to a service to the user, a second data block is provisioned in the service-access-control system 106. In one embodiment, the user may enter his/her passport number in a website operated by the business providing the service (e.g., an airline's website during a ticket booking). In another embodiment, the user may first log into his/her account at the business service (e.g., airliner's website) and then enter his/her passport number into the service-access-control system 106 (e.g., airline's website).

As further shown in FIG. 9, in step 912, the first communication device 102 transmits the data within the first data payload and biometric template to the point-of-service terminal 106 in response to a trigger event in step 910. In an embodiment, the data within the first data payload may contain the user's passport number encrypted with the service-access-control system's public key (e.g. public key of the airline's server). I point-of-service terminal 106 does not have access to the cryptographic key to be able to decrypt data within the first data payload, and therefore does not have access to the user's passport number. In an embodiment, the point-of-service terminal 106 may emit a signal (e.g., a beacon signal) over a short-range wireless radio communication and the first communication device 102 may be triggered in response to receiving the wireless signal (e.g., a Bluetooth low energy beacon), as shown in step 910 of FIG. 9. In this embodiment, zone of physical proximity is determined by range of Bluetooth, which may be 100 metres to 400 metres indoors or 100 metres to 1,000 metres outdoors. In this embodiment, the operating system of the first communication device 102 may invoke an application in the background and the application may establish a wireless connection with the point-of-service terminal 106 in the background, thus providing a significant convenience to the user by eliminating the need for the user to take first communication device 102 (e.g., smartphone) out of her pocket, start an application, and request or accept a wireless connection. However, in this embodiment, there is only a limited time period, as shown by time period 914 in FIG. 9, typically up to 3 minutes, within which the first communication device 102 may transmit the first data payload and the biometric template over the wireless network, as shown in step 912 in FIG. 9, to the point-of-service terminal 106. In one embodiment, the first communication device 102 will not respond in the background to a second or any subsequent receipt of the beacon signal from the point-of-service terminal 106 as long as the first communication device 102 stays within the said zone of physical proximity or does not re-enter the said zone.

As shown in an embodiment in FIG. 9, in step 930, the point-of-service terminal 106 deletes from its memory the first data payload and the biometric template received from the first communication device 102 upon expiration of a time period shown as 932, which is typically in the order of hours, or more specifically, in a range of 15 minutes to 48 hours. Before the end of time period 932, in step 920, one or more live biometric sample(s) is/are captured from the user by the point-of-service terminal 106. In one embodiment, the biometric may be facial characteristics, and the point-of-service terminal 106 may be triggered by locating a face in its camera's field-of-view when the user walks up to it and thus without the need for the user to take any other explicit action. Not shown in FIG. 9, are any number of data payloads and biometric templates of other users that may have been stored in the memory of the point-of-service terminal 106 after being received from other communication devices that entered the zone of proximity of the point-of-service terminal 106 within template expiration time period. In one embodiment, point-of-service terminal 106 does not have decryption key to decrypt any of the data within the payloads, but rather only a set of biometric templates without any other personally identifying information. In one embodiment, the point-of-service terminal 106 compares the live biometric sample(s) of the user with all or a subset of the unexpired biometric templates, which includes the user's biometric template. In one embodiment, the point-of-service determines the biometric match decision based on the biometric comparison(s) and upon determining a positive match decision, sends the corresponding data within the first data payload (e.g. the user's passport number encrypted with the public key of the airline's server) to the service-access-control system 104 by incorporating it as data within a second data payload as shown in step 922 of FIG. 9.

As shown in FIG. 9, in step 924, the service-access-control system 104 identifies the user or the service to the user, based on the result of a computation involving the data within the second data payload and the second data block. In an embodiment, the data within the second data payload is decrypted using service-access-control system's 104 private key (e.g., private key of the airline's server) and compared against the data in the second data block (e.g., passport number that the user has previously provided to the airline). If the comparison result is positive (e.g., the passport number saved as data in the second data block is the same as the passport number decrypted from the data in the second data payload), the service-access-control system 104 generates a control signal authorizing the service to the user (e.g., allowing the user to board the airline's flight).

Figure 10:
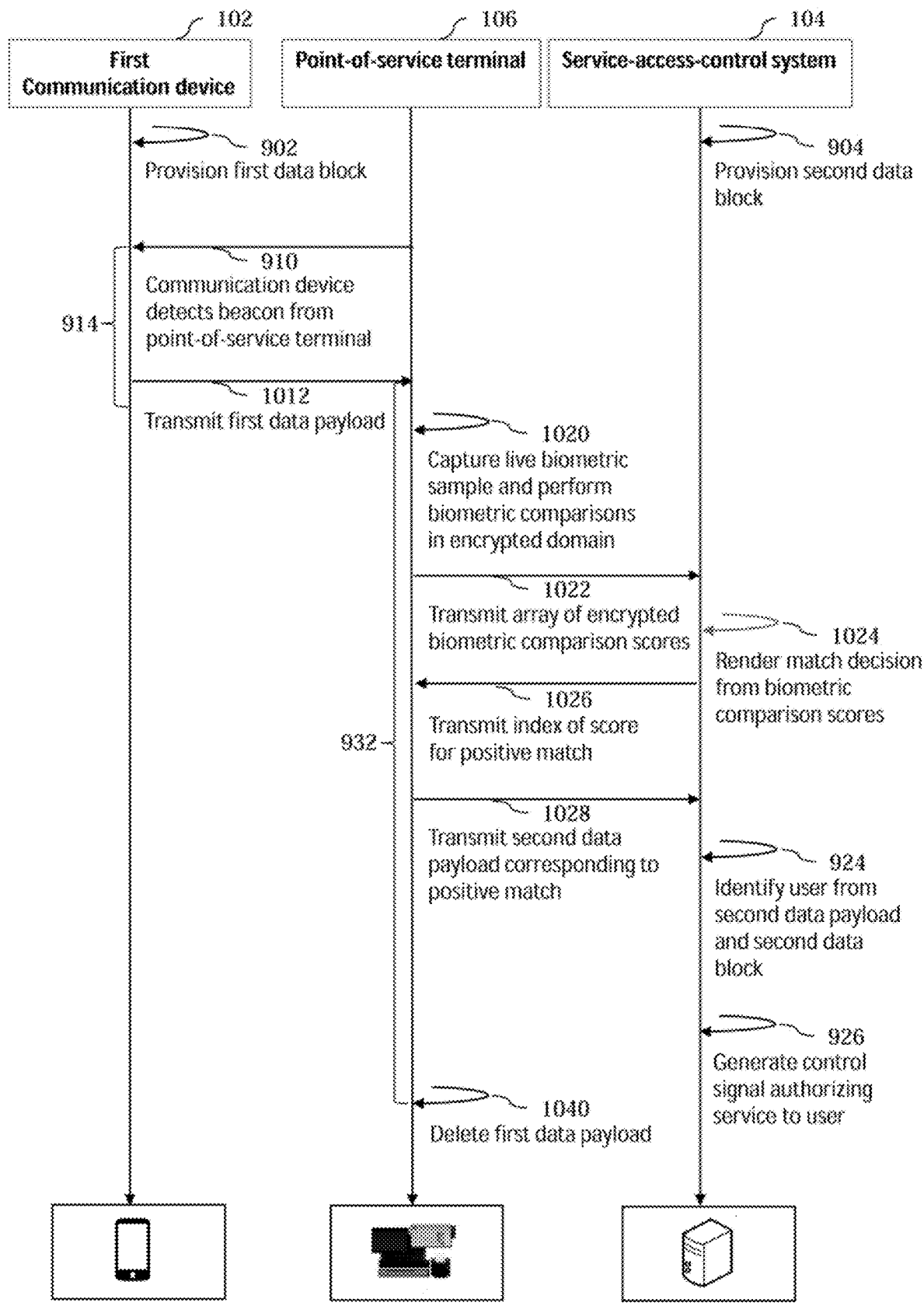

FIG. 10 is a sequence diagram of a non-limiting exemplary embodiment of a process 1000 illustrating an example of the system 100 comprising a first communication device 102, a service-access-control system 104, and a point-of-service terminal 106 configured for implementing the teachings of the present invention. As shown, one or more of the steps of process 1000 are performed (e.g., completely or partially, and/or the like) by the first communication device 102, the service-access-control system 104, and the point-of-service terminal 106. In this embodiment the point-of-service terminal 106 cannot decipher or correlate any personally identifying information of the user, including the user's biometric information. As a result, if a user enters the proximity zone of the point-of-service terminal 102 multiple times, the point-of-service terminal 102 cannot determine if it is the same user, thus providing even greater privacy protection to the user.

As shown in FIG. 10, in step 1012, first communication device 102 transmits a first data payload to the point-of-service terminal 106 in response to a trigger event in step 910. In an embodiment the first communication device 102 encrypts the user's biometric template with homomorphic encryption using the service-access-control system's 104 public homomorphic key (PK). The first communication device 102 generates secure random session key, encrypts the data from the first data block (e.g. passport number) using a symmetric encryption algorithm with the session key. It also encrypts the sessions key using the service-access-control system's 104 public key. The first communication device 102 concatenates the homomorphically encrypted biometric template, encrypted data from the first data block and encrypted session key, includes the concatenated data as data in the first data payload, and transmits the first data payload to the point-of-service terminal 106 over a wireless network in step 1012.

As shown in FIG. 10, in step 1020, the point-of-service terminal 106 compares the live biometric sample(s) of the user with a set of the unexpired biometric templates, which includes the user's biometric template, in the encrypted domain using the service-access-control system's evaluation key (EK), to produce homomorphically encrypted array of biometric comparison scores. In step 1022, the point-of-service terminal 106 transmits the homomorphically encrypted array of biometric comparison scores to the service-access-control system 104. In addition, the point-of-service terminal 106 makes a copy of the array of the data from the first data payloads maintaining a one-to-one correspondence with the elements of the array of encrypted comparison scores transmitted to the service-access-control device 104.

As shown in FIG. 10, in step 1024, the service-access-control system 104 decrypts the biometric comparison scores using its homomorphic secret key (SK), compares them with a predefined threshold to obtain a match decision. If there is a positive match, it transmits the index of the matching biometric template to the point-of-service terminal 106 in step 1026. In step 1028, the point-of-service terminal 106 transmits to the service-access-control system 104 a second data payload comprising the non-biometric data from the first data payload corresponding to the received index. The service-access-control system 104 identifies the user in step 924 and generates the signal authorizing the service to the user in step 926. In step 1040, the point-of-service terminal deletes the first data payload from its memory upon expiration of the time period 932.

Figure 11:
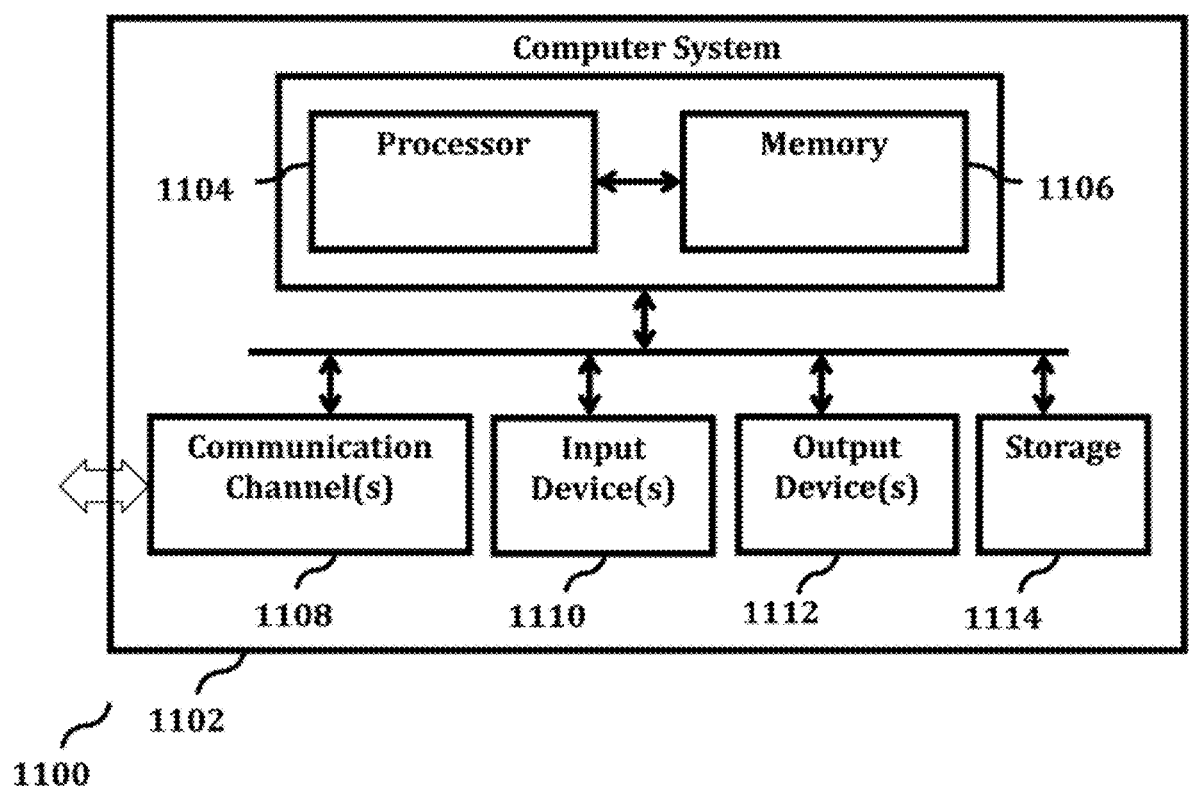
FIG. 11 illustrates an exemplary computer system of a type within which one or more methods, method steps or features of the present invention may be implemented.

FIG. 11 illustrates an exemplary system 1100 of a type within which one or more methods, method steps or features of the present invention may be implemented. The illustrated system 1100 comprises computer system 1102 which in turn comprises one or more processors 1104 and at least one memory 1106. Processor 1104 is configured to execute program instructions—and may be a real processor or a virtual processor. It will be understood that computer system 1102 does not suggest any limitation as to scope of use or functionality of described embodiments. The computer system 1102 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1102 in accordance with the present invention may include one or more servers, desktops, laptops, tablets, smart phones, mobile phones, mobile communication devices, tablets, phablets and personal digital assistants. In an embodiment of the present invention, the memory 1106 may store software for implementing various embodiments of the present invention. The computer system 1102 may have additional components. For example, the computer system 1102 may include one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various softwares executing in the computer system 1102 using a processor 1104, and manages different functionalities of the components of the computer system 1102.

The communication channel(s) 1108 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1110 may include, but is not limited to, a touch screen, a keyboard, mouse, pen, joystick, trackball, a voice device, a scanning device, or any another device that is capable of providing input to the computer system 1102. In an embodiment of the present invention, the input device(s) 1110 may be a sound card or similar device that accepts audio input in analog or digital form. The output device(s) 1112 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1102.

The storage 1114 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1102. In various embodiments of the present invention, the storage 1114 may contain program instructions for implementing any of the described embodiments.

In an embodiment of the present invention, the computer system 1102 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1102. The method described herein is typically implemented as a computer program product, comprising a set of program instructions that is executed by the computer system 1102 or any other similar device.

The set of program instructions may be a series of computer readable codes stored on a tangible medium, such as a computer readable storage medium (storage 1114), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly implements solutions that enable service providers to securely and accurately identify and authenticate a user at a point-of-service, and/or monitor or control a user's access to a service at a point-of-service, irrespective of the number of users enrolled for identity authentication (i.e. irrespective of the database size)—since the biometric comparison process is no longer reliant on access to a centralized database of enrolled biometric templates. Additionally, the invention provides solutions that enable user identity authentication with minimal effort or no effort on the part of the user, while ensuring that a service provider can uniquely identify and authenticate an authorized user seamlessly at the point-of-service, and simultaneously ensuring data privacy and data security.

Other advantages offered by the invention are that (i) the enrolled biometric data resides with the user in the first communication device, (ii) enrolled biometric information is securely shared by the first communication device only with the point-of-service terminal, only for a brief period of time, only in its physical proximity, and only in the background without needing any explicit user action, (iii) the service-access-control system does not get access to enrolled biometric data or for that matter to acquired live biometric samples, (iv) the biometric comparison list is significantly reduced since only a small subset of a business' users are expected to be in the physical proximity of a point-of-service terminal, thereby substantially improving biometric identification accuracy, and maintaining usability of the system irrespective of the total number of enrollees.

In an embodiment, the invention comprises a method for monitoring or controlling a user's access to a service at a point-of-service. The method comprises performing at a processor implemented point-of-service terminal, the steps of (i) receiving a first data payload from a first communication device, wherein (a) data within the first data payload is based on a first data block stored in memory that is accessible by the first communication device, wherein the first data block corresponds to a second data block stored in a memory that is accessible by a service-access-control system, and (b) at least one of the data within the first data payload or the first data block or the second data block is associated with any of the user, the service, or user's access to the service; (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) and transmitting a second data payload to the service-access-control system. Data within the second data payload is based on the data within the first data payload. Additionally, the data within the second data payload enables the service-access-control system to identify the user based on output from a computation involving the data within the second data payload and data within the second data block. In an embodiment of this method, the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In an embodiment of the method, (i) the data within the first data payload that is based on the first data block comprises the user biometric template or the user biometric data, or (ii) data within the first data payload comprises (a) the data that is based on the first data block, and (b) the user biometric template or the user biometric data that is received at the point-of-service terminal from the first communication device, or (iii) data within the first data payload is based on the first data block, and the user biometric template or the user biometric data is transmitted from the first communication device to the point-of-service terminal within an additional data payload that is distinct from the first data payload.

In one embodiment of the above method, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an alternate embodiment of the method, the point-of-service terminal additionally transmits to the service-access-control system, an encrypted or unencrypted data output from the biometric comparison, wherein the service-access-control system is configured to (i) generate a match decision based on the encrypted or unencrypted data output, and (ii)

responsive to the generated match decision comprising a positive match decision, identifying the second data payload associated with the user biometric template and processing data within said second data payload for identifying the user or the service to the user, based on the result of a computation involving the data within the second data payload and the second data block.

In another embodiment, the invention provides a method for monitoring or controlling a user's access to a service at a point-of-service, comprising performing at a processor implemented first communication device, the steps of (i) transmitting to the point-of-service terminal, a first data payload, wherein (a) data within the first data payload is based on a first data block stored in a memory accessible by the first communication device, (b) the first data block corresponds to a second data block stored in a memory that is accessible by a service-access-control system, and (c) at least one of the data within the first data payload or the first data block or the second data block is associated with any of the user, the service or user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal authorizing or recording the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In an embodiment of this method (i) the data within the first data payload that is based on the first data block comprises the user biometric template or the user biometric data, or (ii) the data within the first data payload comprises (a) the data that is based on the first data block, and (b) the user biometric template or the user biometric data, or (iii) the user biometric template or the user biometric data is transmitted from the first communication device to the point-of-service terminal within an additional data payload that is distinct from the first data payload.

In a particular embodiment of this method, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an alternate embodiment of this method, the point-of-service terminal additionally transmits to the service-access-control system, an encrypted or unencrypted data output from the biometric comparison, wherein the service-access-control system is configured to (i) generate a match decision based on the encrypted or unencrypted data output and (ii) responsive to the generated match decision comprising the positive match decision, identifying the second data payload associated with the user biometric template and processing data within said second data payload for identifying the user or the service to the user, based on the result of a computation involving the data within the second data payload and the second data block.

In yet another embodiment the invention provides a method for monitoring or controlling a user's access to a service at a point-of-service terminal, comprising performing at a processor implemented service-access-control system, the steps of (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In an embodiment of this method (i) the data within the first data payload comprises the user biometric template or the user biometric data, or (ii) the data within the first data payload comprises (a) the data that is based on the first data block, and (b) the user biometric template or the user biometric data, or (iii) the data within the first data payload is based on the first data block, and the user biometric template or the user biometric data is transmitted from the first communication device to the point-of-service terminal within an additional data payload that is distinct from the first data payload.

In a specific embodiment of this method, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an alternate embodiment of this method, the service-access-control system (i) receives an encrypted or unencrypted data output from the biometric comparison, (ii) generates a match decision based on the encrypted or unencrypted data output, and (iii) responsive to the generated match decision comprising the positive match decision, identifies the second data payload associated with the user biometric template and processes data within said second data payload for identifying the user or the service to the user, based on the result of a computation involving the data within the second data payload and the second data block.

The invention also provides a point-of-service terminal configured for monitoring or controlling a user's access to a service at a point of service. The point-of-service terminal comprises at least one processor and at least one memory, and is configured to implement the steps of (i) receiving a first data payload from a first communication device—wherein (a) data within the first data payload is based on a first data block stored in a memory that is accessible by the first communication device, wherein the first data block corresponds to a second data block stored in a memory that is accessible by a service-access-control system, and (b) at least one of the data within the first data payload or the first data block or the second data block is associated with the any of the user, the service, or user's access to the service, (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) transmitting a second data payload to the service-access-control system—wherein (e) data within the second data payload is based on the data within the first data payload, (f) the data within the second data payload enables the service-access-control system to identify the user based on output from a computation involving the data within the second data payload and data within the second data block, and (g) the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In an embodiment, the point-of-service terminal is configured such that (i) the data within the first data payload that is based on the first data block comprises the user biometric template or the user biometric data that is received at the point-of-service terminal from the first communication device, or (ii) the first data payload comprises (a) the data that is based on the first data block, and (b) the user biometric template or the user biometric data that is received at the point-of-service terminal from the first communication device, or (iii) the user biometric template or the user biometric data is transmitted from the first communication device to the point-of-service terminal within an additional data payload that is distinct from the first data payload.

In an embodiment, the point-of-service terminal is configured such that the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an alternate embodiment the point-of-service terminal is configured to additionally transmit to the service-access-control system, an encrypted or unencrypted data output from the biometric comparison, wherein the service-access-control system is configured to (i) generate a match decision based on the encrypted or unencrypted data output, and (ii) responsive to the generated match decision comprising the positive match decision, identifying the second data payload associated with the user biometric template and processing data within said second data payload for identifying the user or the service to the user, based on the result of a computation involving the data within the second data payload and the second data block.

In another embodiment, the invention provides a first communication device configured for monitoring or controlling a user's access to a service at a point-of-service. The first communication device comprises at least one processor, and at least one memory, and is configured to implement the steps of (i) transmitting to the point-of-service terminal, a first data payload, wherein (a) data within the first data payload is based on a first data block stored within a memory that is accessible by the first communication device, (b) the first data block corresponds to a second data block stored in a memory that is accessible by a service-access-control system, and (c) at least one of the data within the first data payload or the first data block or the second data block is associated with any of the user, the service or with user' access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In an embodiment of the first communication device, said first communication device is configured such that (i) the data within the first data payload that is based on the first data block comprises the user biometric template or the user biometric data that is received at the point-of-service terminal from the first communication device, or (ii) the first data payload comprises (a) the data that is based on the first data block, and (b) the user biometric template or the user biometric data that is received at the point-of-service terminal from the first communication device, or (iii) the user biometric template or the user biometric data is transmitted from the first communication device to the point-of-service terminal within an additional data payload that is distinct from the first data payload.

In a particular embodiment of the first communication device, said first communication device is configured such that the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an alternate embodiment of the first communication device, said first communication device is configured such that, the point-of-service terminal additionally transmits to the service-access-control system, an encrypted or unencrypted data output from the biometric comparison, wherein the service-access-control system is configured to (i) generate a match decision based on the encrypted or unencrypted data output and (ii) responsive to the generated match decision comprising the positive match decision, identifying the second data payload associated with the user biometric template and processing data within said second data payload for identifying the user or the service to the user, based on the result of a computation involving the data within the second data payload and the second data block.

The invention additionally provides a service-access-control system configured to enable secure biometric authentication at a point-of-service terminal in connection with a request for providing a service to a user. The service-access-control system comprises at least one server, said at least one server comprising at least one processor and at least one memory, wherein the service-access-control system is configured to implement the steps of: (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, based on the result of the computation, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In a specific embodiment of the service-access-control system, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In an embodiment of the service-access-control system (i) the data within the first data payload that is based on the first data block comprises the user biometric template or the user biometric data that is received at the point-of-service terminal from the first communication device, or (ii) the first data payload comprises (a) the data that is based on the first data block, and (b) the user biometric template or the user biometric data that is received at the point-of-service terminal from the first communication device, or (iii) the user biometric template or the user biometric data is transmitted from the first communication device to the point-of-service terminal within an additional data payload that is distinct from the first data payload.

In an alternate embodiment of service-access-control system, the service-access-control system (i) receives an encrypted or unencrypted data output from the biometric comparison, (ii) generates a match decision based on the encrypted or unencrypted data output, and (iii) responsive to the generated match decision comprising the positive match decision, identifies the second data payload associated with the user biometric template and processes data within said second data payload for identifying the user or the service to the user, based on the result of a computation involving the data within the second data payload and the second data block.

In one embodiment, the invention provides a computer program product for monitoring or controlling a user's access to a service at a point-of-service, comprising a non-transitory computer readable medium having a computer readable program code embodied therein, the computer readable program code comprising instructions for performing at a processor implemented point-of-service terminal, the steps of (i) receiving a first data payload from a first communication device, wherein (a) data within the first data payload is based on a first data block stored in memory that is accessible by the first communication device, wherein the first data block corresponds to a second data block stored in a memory that is accessible by a service-access-control system, and (b) at least one of the data within the first data payload or the first data block or the second data block is associated with any of the user, the service, or user's access to the service; (ii) acquiring a biometric sample through a biometric sample acquisition sensor, (iii) performing a biometric comparison between the acquired biometric sample, and a set of biometric templates stored in a point-of-service terminal memory, wherein the set of biometric templates includes at least a user biometric template associated with the user, wherein (c) said user biometric template has been generated based on user biometric data associated with the user, and (d) the user biometric template or the user biometric data has been received by the point-of-service terminal, from the first communication device, and (iv) and transmitting a second data payload to the service-access-control system. Data within the second data payload is based on the data within the first data payload. Additionally, the data within the second data payload enables the service-access-control system to identify the user based on output from a computation involving the data within the second data payload and data within the second data block. In an embodiment of this method, the service-access-control system is configured to respond to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In another embodiment, the invention provides a computer program product for monitoring or controlling a user's access to a service at a point-of-service terminal, comprising a non-transitory computer readable medium having a computer readable program code embodied therein, the computer readable program code comprising instructions for performing at a processor implemented first communication device, the steps of (i) transmitting to the point-of-service terminal, a first data payload, wherein (a) data within the first data payload is based on a first data block stored in a memory accessible by a first communication device, (b) the first data block corresponds to a second data block stored in a memory that is accessible by a service-access-control system, and (c) at least one of the data within the first data payload or the first data block or the second data block is associated with any of the user, the service or user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (a) data within the second data payload is based on the data within the first data payload, and (b) the data within the second data payload enables the service-access-control system to identify the user based on output from a computation involving the data within the second data payload and data within the second data block.

Further, in this embodiment, the service-access-control system is configured to respond to identifying the user, based on the result of the computation, by generating a control signal authorizing or recording the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In yet another embodiment, the invention provides a computer program product for monitoring or controlling a user's access to a service at a point-of-service terminal, comprising a non-transitory computer readable medium having a computer readable program code embodied therein, the computer readable program code comprising instructions for performing at a processor implemented service-access-control system the steps of (i) storing within a memory accessible by the service-access-control system, a second data block, wherein the second data block corresponds to a first data block stored in a memory accessible by a first communication device—wherein the first communication device is configured to transmit to the point-of-service terminal (a) a first data payload, wherein (1) data within the first data payload is based on the first data block, and (2) at least one of the data within the first data payload or the first data block or the second data block is associated with any of the user, the service, or the user's access to the service.

In this embodiment, the point-of-service terminal is configured to (i) acquire a biometric sample through a biometric sample acquisition sensor, (ii) perform a biometric comparison between the acquired biometric sample, and a set of biometric templates stored in a point-of-service terminal memory, wherein the set of biometric templates includes at least a user biometric template associated with the user, wherein (a) said user biometric template has been generated based on user biometric data associated with the user, and (b) the user biometric template or the user biometric data has been received by the point-of-service terminal, from the first communication device, and (iii) transmit a second data payload to the service-access-control system—wherein (1) data within the second data payload is based on the data within the first data payload, and (2) the data within the second data payload enables the service-access-control system to identify the user based on output from a computation involving the data within the second data payload and data within the second data block.

The service-access-control system is further configured for responding to identifying the user, by generating a control signal that authorizes or records the user's access to the service, the control signal being generated subsequent to generation of a positive match decision based on data output from the biometric comparison performed at the point-of-service terminal wherein the positive match decision is generated in response to identification of a predefined degree of similarity between the acquired biometric sample and the user biometric template.

In a more particular embodiment of any of the invention embodiments described above, a correspondence between the first data block and the second data block is defined by a set of predefined functions.

In a specific embodiment of any of the invention embodiments described above, (i) the first data block is generated based on data within a third data payload received at the first communication device from the service-access-control system or from a trusted intermediary, or (ii) the second data block is generated based on data within a fourth data payload received at the service-access-control system from the first communication device or from the trusted intermediary.

In an exemplary embodiment of any of the invention embodiments described above, (i) each of the first data block and the second data block include a set of data included within the other of the first data block and the second data block, or (ii) the first data block and the second data block are identical, or (iii) one of the first data block and the second data block is derived from the other of the first data block and the second data block, or (iv) each of the first data block and the second data block are generated based on at least one of a common shared secret data block or a common key derivation function.

In one or more of the invention embodiments described above, the first communication device is configured to respond to a time alarm or a location alarm or a notification from the service-access-control system, by (i) initiating wireless communication session with the service-access-control system or the point-of-service terminal, and (ii) initiating transmission of the user biometric template and the first data payload to the point-of-service terminal over the wireless communication session.

In a more specific embodiment, the first communication device is configured to respond to receipt of a beacon signal transmitted from the point-of-service terminal or from an access point device that is communicably coupled with the point-of-service terminal, by (i) initiating short-range wireless communication session with the point-of-service terminal or the access point device; and (ii) initiating transmission of the user biometric template and the first data payload to the point-of-service terminal over the short-range wireless communication session.

It will be noted that in certain invention embodiments, the control signal is transmitted to an access control device, and receipt of the control signal at the access control device triggers operation of the access control device to enable the user (i) to access or receive a service, or access into or through an access restricted location. The access control device can be communicably coupled with or comprise a part of the either the point-of-service terminal or the service-access-control system.

In various embodiments of the invention (i) the data within the first data payload comprises the user biometric template or the user biometric data, or (ii) the data within the first data payload comprises (a) the data that is based on the first data block, and (b) the user biometric template or the user biometric data, or (iii) the data within the first data payload is based on the first data block, and the user biometric template or the user biometric data is received at the point-of-service terminal from the first communication device within an additional data payload that is distinct from the first data payload.

In various embodiments of the invention the set of biometric templates stored in the point-of-service terminal memory includes at least one additional biometric template that is distinct from the user biometric template, wherein (i) the additional biometric template has been generated based on additional biometric data that is distinct from the user biometric data, and (ii) the additional biometric template or the additional biometric data has been received by the point-of-service terminal, from a second communication device, wherein the second communication device is distinct from the first communication device.

In various embodiments of the invention, the first communication device transmits the first data payload in response to (i) the first communication device entering a zone near the point-of-service terminal, wherein the distance between—the first communication device and the point-of-service terminal is in a range of 1 to 1,000 metres, or (ii) the first communication device receiving a wireless signal transmitted from the point-of-service terminal or from an access point device that is communicably coupled with the point-of-service terminal, or (iii) a time alarm or a location alarm or a notification generated within the first communication device or received from the service-access-control system.

In various embodiments of the invention, the second data payload is transmitted from the point-of-service terminal to the service-access-control system in response to the biometric comparison at the point-of-service terminal resulting in the positive match decision, said positive match decision resulting from comparison of the acquired biometric sample and the user biometric template.

In various embodiments of the invention, the point-of-service terminal additionally transmits to the service-access-control system, an encrypted or unencrypted data output from the biometric comparison, wherein the service-access-control system is configured to (i) generate a match decision based on the encrypted or unencrypted data output, and (ii) responsive to the generated match decision comprising the positive match decision, identifying the second data payload associated with the user biometric template and processing data within said second data payload for identifying the user or the service or the user's access to the service, based on the result of a computation involving the data within the second data payload and the second data block.

In various embodiments of the invention, (i) the first data block is generated based on data within a third data payload received at the first communication device from the service-access-control system or from a trusted intermediary, or (ii) the second data block is generated based on data within a fourth data payload received at the service-access-control system from the first communication device or from a trusted intermediary.

In various embodiments of the invention, (i) each of the first data block and the second data block include a set of data included within the other of the first data block and the second data block, or (ii) the first data block and the second data block are identical, or (iii) one of the first data block and the second data block is derived from the other of the first data block and the second data block, or (iv) a correspondence between the first data block and the second data block is defined by a set of predefined functions, or (v) each of the first data block and the second data block are generated based on at least one of a common shared secret data block or a common key derivation function.

In various embodiments of the invention, (i) the control signal is transmitted to an access control device, and (ii) receipt of the control signal at the access control device triggers operation of the access control device to enable the user (a) to access or receive a service, or (b) access into or through an access restricted location.

In various embodiments of the invention, the user biometric template and data within the first data payload are deleted from the point-of-service terminal memory after expiration of a predetermined time period or in response to a time alarm or a notification generated within the point-of-service terminal or received from the service-access-control system or the first communication device.

In various embodiments of the invention, (i) the data within the first data payload is an output of an encryption function or is derived from an output of an encryption function and requires a cryptographic key for decryption, wherein the cryptographic key is isolated from the point-of-service terminal, or (ii) the data within the first data payload is an output of a one-way function or is derived from an output of a one-way function, or (iii) the data within the first data payload is an output of a cryptographic hash function or is derived from an output of a cryptographic hash function.

In various embodiments of the invention, (i) the data within the first data payload and the data within the second data payload are identical, or (ii) the data within the second data payload is data extracted from the data within the first data payload, or (iii) the data within the second data payload is generated by a function that receives data extracted from the data within the first data payload as an input.

In various embodiments of the invention, the user biometric template and data within the first data payload may be stored in a memory of the point-of-service terminal after verifying that the user biometric template received from the first communication device has been signed, certified or authenticated by a trusted entity.

In certain invention embodiments, the user biometric template and data within the first data payload stored in a memory of the point-of-service terminal are deleted after the expiration of a predetermined time period or in response to a time alarm or a notification from the service-access-control system or the first communication device.

In some embodiments of the invention, the biometric sample and the user biometric template both correspond to a same biometric-type, wherein the biometric-type is any one of a voice based, iris based, retina based, fingerprint based, palm-print based, palm vein based, periocular based, facial characteristic based, ear based, DNA (deoxyribonucleic acid) based, scleral vein based, finger geometry based, palm geometry based, gait based, heartbeat based, vascular based, signature based, or any other human body part based biometric. In other embodiments of the invention, the biometric sample and the biometric template may correspond to a specific object associated with the user.

In one embodiment of the invention, (i) the data within the first data payload and the data within the second data payload are identical, or (ii) the data within the second data payload is generated by a function that receives data extracted from the data within the first data payload as an input, or (iii) the data within the first data payload is an encrypted data that requires at least one cryptographic key for decryption, and wherein the at least one cryptographic key is isolated from the point-of-service terminal.

In one or more particular embodiments of the invention, the first data block is transmitted to the first communication device from the service-access-control system over a secure communication session initiated between the first communication device and the service-access-control system.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

What is claimed is:

1. A method for monitoring or controlling a user's access to a service at a point-of-service, comprising performing at a processor implemented point-of-service terminal, the steps of:

acquiring a biometric sample of the user through a biometric sample acquisition sensor;

performing a biometric comparison between the acquired biometric sample, and a set of biometric templates stored in a point-of-service terminal memory;

and transmitting a second data payload to the service-access-control-system;

wherein the set of biometric templates comprises a plurality of biometric templates, said plurality of biometric templates including a user's biometric template and at least one additional biometric template that is distinct from the user's biometric template;

wherein:
each of the biometric templates within the set of biometric templates has been transmitted from, or has been generated based on biometric data transmitted from, a respective communication device to the point-of-service terminal; and for each of the biometric templates within the set of biometric templates, the point-of-service terminal has also received an associated data payload corresponding to said biometric template from the respective communication device, and has stored the associated data payload or data derived from the associated data payload in an associated data block in a point-of-service terminal memory;

wherein:
the user's biometric template or user's biometric data based on which the user's biometric template has been generated, is received by the point-of-service terminal from a first communication device; and the at least one additional biometric template that is distinct from the user's biometric template, or biometric data based on which said at least one biometric template has been generated, is received by the point-of-service terminal, from a second communication device, wherein the second communication device is distinct from the first communication device;

wherein:
the second data payload that is transmitted from the point-of-service terminal to the service-access-control system, includes data from or data based on an identified data block from among associated data blocks stored in the point-of-service terminal memory, each of the associated data blocks corresponding to a biometric template within the set of biometric templates;

wherein said identified data block is identified from among the associated data blocks based on:
a positive match decision that results from a comparison of the user's biometric sample and a matching biometric template within the set of biometric templates; and determining as the identified data block, a specific associated data block that stores either an associated data payload corresponding to said matching biometric template or data derived from the associated data payload corresponding to said matching biometric template;

wherein the data within the second data payload enables the service-access-control system to determine whether the user is authorized to access the service;

and wherein the service-access-control system is configured to respond to determining that the user is authorized to access the service, by generating a control signal that authorizes or records the user's access to the service.

2. A method for monitoring or controlling a user's access to a service at a point-of-service, comprising performing at a processor implemented first communication device, the steps of:

transmitting to the point-of-service terminal:
  a user's biometric template or user's biometric data that enables generation of the user's biometric template; and
  a data payload corresponding to the user's biometric template or user's biometric data;

wherein the point-of-service terminal is configured to:
  acquire a biometric sample of the user through a biometric sample acquisition sensor;
  perform a biometric comparison between the acquired biometric sample, and a set of biometric templates stored in a point-of-service terminal memory; and
    transmitting transmit a second data payload to the service-access-control system;
  wherein:
    the set of biometric templates comprises a plurality of biometric templates, said plurality of biometric templates including the user's biometric template and at least one additional biometric template that is distinct from the user's biometric template;
  wherein:
    each of the biometric templates within the set of biometric templates has been transmitted from, or has been generated based on biometric data transmitted from, a respective communication device to the point-of-service terminal; and
    for each of the biometric templates within the set of biometric templates, the point-of-service terminal has also received an associated data payload corresponding to said biometric template from the respective communication device, and has stored the associated data payload or data derived from the associated data payload in an associated data block in the point-of-service terminal memory; and
    the at least one additional biometric template that is distinct from the user's biometric template, or biometric data based on which said at least one biometric template has been generated, is received by the point-of-service terminal, from a second communication device, wherein the second communication device is distinct from the first communication device;
  wherein:
    the second data payload that is transmitted from the point-of-service terminal to the service-access-control system, includes data from or data based on an identified data block from among associated data blocks stored in the point-of-service terminal memory, each of the associated data blocks corresponding to a biometric template within the set of biometric templates;

wherein said identified data block is identified from among the associated data blocks based on:
    a positive match decision that results from a comparison of the user's biometric sample and a matching biometric template within the set of biometric templates; and
    determining as the identified data block, a specific associated data block that stores either an associated data payload corresponding to said matching biometric template or data derived from the associated data payload corresponding to said matching biometric template;

wherein the data within the second data payload enables the service-access-control system to determine whether the user is authorized to access the service;

and wherein the service-access-control system is configured to:
respond to determining that the user is authorized to access the service, by generating a control signal that authorizes or records the user's access to the service.

3. A method for monitoring or controlling a user's access to a service at a point-of-service, comprising performing at a processor implemented service-access-control system, the steps of:

receiving from a point-of-service terminal, a second data payload, wherein the second data payload is preceded by the steps of:
  acquiring a biometric sample of a user through a biometric sample acquisition sensor; and
  performing a biometric comparison between the acquired biometric sample, and a set of biometric templates stored in a point-of-service terminal memory;
  wherein the set of biometric templates comprises a plurality of biometric templates, said plurality of biometric templates including the user's biometric template and at least one additional biometric template that is distinct from the user's biometric template;
  wherein:
    each of the biometric templates within the set of biometric templates has been transmitted from, or has been generated based on biometric data transmitted from, a respective communication device to the point-of-service terminal; and
    for each of the biometric templates within the set of biometric templates, the point-of-service terminal has also received an associated data payload corresponding to said biometric template from the respective communication device, and has stored the associated data payload or data derived from the associated data payload in an associated data block in a point-of-service terminal memory;
  wherein:
    the user's biometric template or user's biometric data based on which the user's biometric template has been generated, is received by the point-of-service terminal from a first communication device; and
    the at least one additional biometric template that is distinct from the user's biometric template, or biometric data based on which said at least one biometric template has been generated, is received by the point-of-service terminal, from a second communication device, wherein the second communication device is distinct from the first communication device;
wherein:
the second data payload that is received at the service-access-control system from the point-of-service terminal, includes data from or data based on an identified data block from among associated data blocks stored in the point-of-service terminal memory, each of the associated data blocks corresponding to a biometric template within the set of biometric templates;
wherein said identified data block is identified from among the associated data blocks based on:
a positive match decision that results from a comparison of the user's biometric sample and a matching biometric template within the set of biometric templates; and
determining as the identified data block, a specific associated data block that stores either an associated data payload corresponding to said matching biometric template or data derived from the associated data payload corresponding to said matching biometric template;
wherein the data within the second data payload enables the service-access-control system to determine whether the user is authorized to access the service;
and responding to determining that the user is authorized to access the service, by generating a control signal that authorizes or records the user's access to the service.

4. The method as claimed in claim 1, wherein:
the user's biometric template or user's biometric data based on which the user's biometric template has been generated, is inaccessible to the service-access-control system.

5. The method as claimed in claim 1, wherein each associated data payload received at the point-of-service terminal is based on an associated communication device data block stored in a memory of the respective communication device that transmitted said associated data payload, wherein said associated communication device data block corresponds to an associated service-access-control system data block stored in a memory that is accessible by the service-access-control system.

6. The method as claimed in claim 5, wherein the service-access-control system determines whether the user is authorized to access the service based on an output of a computation involving the data within the second data payload and data within one or more associated service-access control system data blocks.

7. The method as claimed in claim 1, wherein:
the associated data payload includes or is based on a current timestamp, and the service-access-control system is configured to generate the control signal only if the timestamp falls within a predefined time interval.

8. The method as claimed in claim 1, wherein:
data within the second data payload is derived from the user's biometric template or from user's biometric data based on which the user's biometric template has been generated.

9. The method as claimed in claim 1, wherein the service-access-control system is configured to generate the control signal that authorizes or records the user's access to the service only if the user's biometric template or user biometric data based on which the user's biometric template has been generated is determined to be authentic.

10. The method as claimed in claim 1, wherein:
the point-of-service terminal additionally transmits to the service-access-control system a homomorphically encrypted data output from the biometric comparison, wherein:
the service-access-control system is configured to generate a match decision based on the homomorphically encrypted data output; and
responsive to the generated match decision comprising the positive match decision, the identified data block is identified from among the associated data blocks.

11. The method as claimed in claim 1, wherein the transmission of the user's biometric template or user biometric data based on which the user's biometric template has been generated and the associated data payload from a transmitting communication device to the point-of-service terminal concludes within 3 minutes.

12. The method as claimed in claim 1, wherein the user's biometric template or user biometric data based on which the user's biometric template has been generated is deleted from the point-of-service terminal memory after expiration of a predetermined time period or in response to a time alarm or a notification.

13. The method as claimed in claim 2, wherein:
the user's biometric template or user's biometric data based on which the user's biometric template has been generated, is inaccessible to the service-access-control system.

14. The method as claimed in claim 2, wherein each associated data payload received at the point-of-service terminal is based on an associated communication device data block stored in a memory of the respective communication device that transmitted said associated data payload, wherein said associated communication device data block corresponds to an associated service-access-control system data block stored in a memory that is accessible by the service-access-control system.

15. The method as claimed in claim 14, wherein the service-access-control system determines whether the user is authorized to access the service based on an output of a computation involving the data within the second data payload and data within one or more associated service-access control system data blocks.

16. The method as claimed in claim 2, wherein:
the associated data payload includes or is based on a current timestamp, and the service-access-control system is configured to generate the control signal only if the timestamp falls within a predefined time interval.

17. The method as claimed in claim 2, wherein:
data within the second data payload is derived from the user's biometric template or from user's biometric data based on which the user's biometric template has been generated.

18. The method as claimed in claim 2, wherein the service-access-control system is configured to generate the control signal that authorizes or records the user's access to the service only if the user's biometric template or user biometric data based on which the user's biometric template has been generated is determined to be authentic.

19. The method as claimed in claim 2, wherein:
the point-of-service terminal additionally transmits to the service-access-control system a homomorphically encrypted data output from the biometric comparison, wherein:

the service-access-control system is configured to generate a match decision based on the homomorphically encrypted data output; and responsive to the generated match decision comprising the positive match decision, the identified data block is identified from among the associated data blocks.

20. The method as claimed in claim 2, wherein the transmission of the user's biometric template or user biometric data based on which the user's biometric template has been generated and the associated data payload from a transmitting communication device to the point-of-service terminal concludes within 3 minutes.

21. The method as claimed in claim 2, wherein the user's biometric template or user biometric data based on which the user's biometric template has been generated is deleted from the point-of-service terminal memory after expiration of a predetermined time period or in response to a time alarm or a notification.

22. The method as claimed in claim 3, wherein:
the user's biometric template or user's biometric data based on which the user's biometric template has been generated, is inaccessible to the service-access-control system.

23. The method as claimed in claim 3, wherein each associated data payload received at the point-of-service terminal is based on an associated communication device data block stored in a memory of the respective communication device that transmitted said associated data payload, wherein said associated communication device data block corresponds to an associated service-access-control system data block stored in a memory that is accessible by the service-access-control system.

24. The method as claimed in claim 23, wherein the service-access-control system determines whether the user is authorized to access the service based on an output of a computation involving the data within the second data payload and data within one or more associated service-access control system data blocks.

25. The method as claimed in claim 3, wherein:
the associated data payload includes or is based on a current timestamp, and the service-access-control system is configured to generate the control signal only if the timestamp falls within a predefined time interval.

26. The method as claimed in claim 3, wherein:
data within the second data payload is derived from the user's biometric template or from user's biometric data based on which the user's biometric template has been generated.

27. The method as claimed in claim 3, wherein the service-access-control system is configured to generate the control signal that authorizes or records the user's access to the service only if the user's biometric template or user biometric data based on which the user's biometric template has been generated is determined to be authentic.

28. The method as claimed in claim 3, wherein:
the point-of-service terminal additionally transmits to the service-access-control system a homomorphically encrypted data output from the biometric comparison, wherein:
the service-access-control system is configured to generate a match decision based on the homomorphically encrypted data output; and
responsive to the generated match decision comprising the positive match decision, the identified data block is identified from among the associated data blocks.

29. The method as claimed in claim 3, wherein the transmission of the user's biometric template or user biometric data based on which the user's biometric template has been generated and the associated data payload from a transmitting communication device to the point-of-service terminal concludes within 3 minutes.

30. The method as claimed in claim 3, wherein the user's biometric template or user biometric data based on which the user's biometric template has been generated is deleted from the point-of-service terminal memory after expiration of a predetermined time period or in response to a time alarm or a notification.

* * * * *